(12) United States Patent
Quazi

(10) Patent No.: US 7,706,161 B2
(45) Date of Patent: Apr. 27, 2010

(54) SINGLE STAGE RESONANT POWER CONVERTER WITH AUXILIARY POWER SOURCE

(75) Inventor: Fazle S. Quazi, Boulder, CO (US)

(73) Assignee: Energy Conservation Technologies, Inc., Boulder, CO (US)

(*) Notice: Subject to any disclaimer, the term of this patent is extended or adjusted under 35 U.S.C. 154(b) by 80 days.

(21) Appl. No.: 11/375,558

(22) Filed: Mar. 14, 2006

(65) Prior Publication Data

US 2007/0217235 A1  Sep. 20, 2007

(51) Int. Cl.
H02M 5/42 (2006.01)
H02M 7/04 (2006.01)
H02M 7/68 (2006.01)

(52) U.S. Cl. .................... 363/89; 323/207; 323/222; 323/319; 363/17

(58) Field of Classification Search .............. 323/89, 323/205, 207, 222, 319; 315/307; 363/17
See application file for complete search history.

(56) References Cited

U.S. PATENT DOCUMENTS

| | | | |
|---|---|---|---|
| 4,511,823 A | 4/1985 | Eaton et al. | |
| 4,864,482 A | 9/1989 | Quazi et al. | |
| 5,258,902 A | 11/1993 | Lindbery et al. | |
| 5,289,083 A | 2/1994 | Quazi | |
| 5,726,869 A | 3/1998 | Yamashita et al. | |
| 5,818,707 A * | 10/1998 | Seong et al. | 363/89 |
| 5,995,398 A | 11/1999 | Yamauchi et al. | |
| 6,069,811 A | 5/2000 | Moriguchi et al. | |
| 6,075,715 A | 6/2000 | Maehara et al. | |
| 6,118,225 A | 9/2000 | Wessels et al. | |
| 6,124,581 A * | 9/2000 | Ulrich | 219/665 |
| 6,272,027 B1 * | 8/2001 | Fraidlin et al. | 363/26 |
| 6,359,395 B1 | 3/2002 | Quazi et al. | |
| 6,448,744 B1 * | 9/2002 | Malik et al. | 323/207 |
| 6,487,098 B2 * | 11/2002 | Malik et al. | 363/89 |
| 6,798,670 B2 | 9/2004 | King | |
| 7,136,294 B2 * | 11/2006 | Phadke et al. | 363/132 |
| 2001/0011880 A1 | 8/2001 | James | |
| 2003/0222627 A1 * | 12/2003 | Hwang | 323/222 |

* cited by examiner

*Primary Examiner*—Edward Tso
*Assistant Examiner*—Arun Williams
(74) *Attorney, Agent, or Firm*—Patton Boggs LLP

(57) ABSTRACT

The improved single stage power converter circuit topology substantially reduces EMI that is conducted to the AC line, reduces input AC current inrush, improves output ripples by the use of an auxiliary supply near zero crossings of the line AC voltage, provides Power Factors greater than 0.95, provides Total Harmonic Distortions less than 15%, and maintains constant power, including constant power in a non-linear output load. Further, this circuit topology provides output open and short circuit protections by reducing current stress in power components. This topology can also make the power source to appear as a fast-acting variable impedance source, an ideal source for powering an output load that has negative resistance characteristics such as gas discharge lamps.

28 Claims, 28 Drawing Sheets

SINGLE STAGE RESONANT POWER CONVERTER WITH AUXILIARY POWER SOURCE

FIELD OF THE INVENTION

This invention relates to single stage power conversion circuitry used in switched mode inverters and power converters.

BACKGROUND OF THE INVENTION

It is a problem in the field of power conversion that a 50/60 Hz AC power source is typically used in switched mode inverters and converters to provide the input power. The resultant power converter must then deal with both the efficiency of the power conversion operation and the quality of the output voltage, due to the noise generated by converting the 50/60 Hz AC power in the power conversion operation.

In operation, after rectification of the input AC voltage, the power converter conventionally smoothes out the rectified DC sinusoid peaks by using large value electrolytic capacitors. This causes an enormous AC current inrush to the initially uncharged electrolytic capacitors when the power converter is first turned on. In addition, in high power applications, the power converters that use a 50/60 Hz AC power source must comply with regulatory requirements that specify high Power Factor (PF), low Total Harmonic Distortions (THD), and maximum Electromagnetic Interference (EMI) limits. Furthermore, power converter performance is primarily measured in terms of the circuit's ability to regulate power, ripple contents, long-term reliability, and conversion efficiency. Size, weight, and cost are also bottom line determining factors for commercialization of the device.

The power converters can use conventional boost circuit topology to provide high Power Factor, low Total Harmonic Distortion, and output DC power regulation. However, these are achieved in exchange for additional circuitry and power loss, which causes higher cost, increased device size, and in many instances low power conversion efficiency. In addition, high frequency noise is generated by power component switching actions within the power converter.

Therefore, it is difficult to satisfy these competing requirements to produce a power converter that is efficient, reliable, cost effective, and also maintains a constant output to the load without producing an unacceptable level of EMI.

BRIEF SUMMARY OF THE INVENTION

The above-described problems are solved and a technical advance achieved by the improved single stage power factor corrected power converter with reduced AC inrush (termed "improved single stage power converter") while using a single stage power conversion circuit. This novel single stage power conversion circuit topology substantially reduces EMI that is conducted to the AC line, reduces input AC current inrush, improves output ripples, provides Power Factors greater than 0.95, provides Total Harmonic Distortions less than 15%, and maintains constant power, including constant power in a non-linear output load. The load regulation with respect to input AC line variations is also excellent. Further, this circuit topology provides output open and short circuit protections by reducing current stress in power components. This topology can also make the power source to appear as a fast-acting variable impedance source, an ideal source for powering an output load that has negative resistance characteristics such as gas discharge lamps.

The improved single stage power converter reduces output ripples by the use of an auxiliary DC supply which acts as a secondary power source to provide additional output power near zero crossings of the input line AC voltage. This eliminates power variation and flickering into the load near zero crossings. In addition, due to reduced ripples, the value of the output filter capacitor can be substantially smaller, which translates to faster response time for output load regulation. When power switches operate near zero crossings, additional switching noise is produced, but the application of a secondary power source not only reduces these switching noises but also improves overall Power Factor and Total Harmonic Distortion. Further, the application of a secondary power source also adds to the overall output power delivery capacity.

BRIEF DESCRIPTION OF THE DRAWINGS

FIGS. 2A and 2B illustrate prior art gas discharge lamp control and DC-to-DC power supply circuits, while

DETAILED DESCRIPTION OF THE INVENTION

Figure 1:
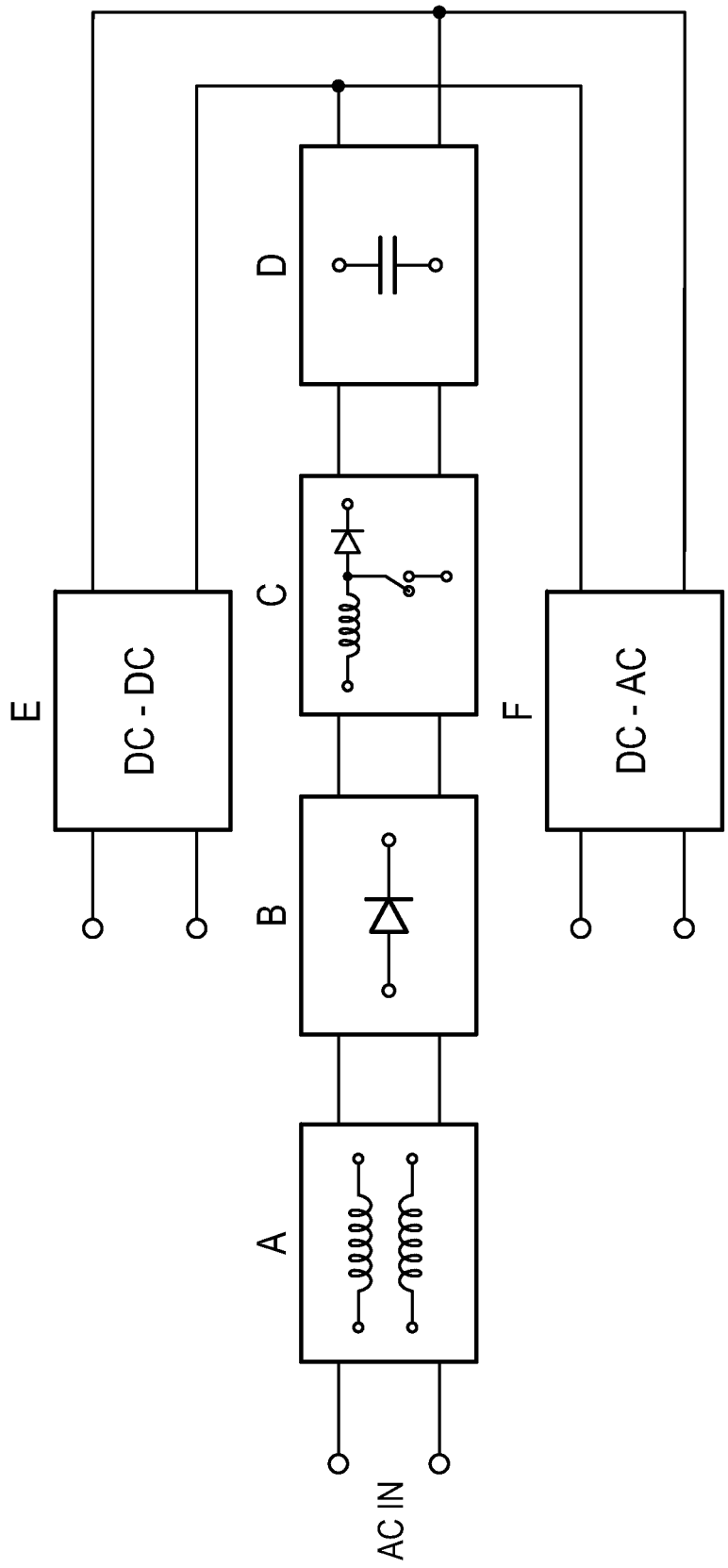
FIG. 1 illustrates in block diagram form a conventional 50/60 Hz AC power conversion scheme.

FIG. 1 illustrates in block diagram form a conventional 50/60 H AC power conversion scheme. Section A is a conducted EMI suppression circuit, section B is for AC-DC rectification, and section C is for obtaining high Power Factor, low Total Harmonic Distortion, and regulated DC power output by widely used boost converter topology. This regulated DC power is then fed to a high frequency DC-DC converter to power an output load with DC power or fed to a high frequency DC-AC inverter to power the output load with AC power. Detailed circuit descriptions of any individual section are not necessary since they are readily available in published literature and textbooks related to the art. Only the following relevant functions are explained for better understanding of the present improved single stage power converter.

1. Immediately following the application of AC power to the device and before the boost circuit of section C starts to operate, the initially uncharged electrolytic capacitor of section D may draw in excess of 300 A current from the input AC source for a period of several milliseconds. This is because the combined circuit impedance between the AC line (AC IN) and the uncharged electrolytic capacitor including the Effective Series Resistance (ESR) of the electrolytic capacitor could easily be less than 1 ohm. Therefore, for example, the peak voltage of a 220V AC line, which is 220V×1.41~310V would cause a current drawn in the electrolytic capacitor in the amount of 310V/1 ohm=310 A. This could be detrimental, for example, to AC line fuses and rectifying diodes. It is important to note that the product of the inrush current peak multiplied by the inrush duration measures the severity of the AC inrush. Additional discussion of this subject can be found in U.S. Pat. No. 4,864,482.
2. The use of conventional boost circuit topology (section A) provides high Power Factor, low Total Harmonic Distortion, and output DC power regulation. However, as described in U.S. Pat. No. 6,359,395 B1, these are achieved in exchange for additional circuitry and power loss, which causes higher cost, increased device size, and in many instances low power conversion efficiency.
3. The DC output power source from a boost regulator, section C, is stored in the smoothing capacitor of section D. This DC power is then used to power a load such as a high frequency DC-DC converter or DC-AC inverter. These are shown respectively in section E and section F of FIG. 1. Since a boost regulator topology works on the principle that output DC must be higher than the input DC peak voltage, the output DC voltage that appears at the input of section E or section F could be very high in magnitude for most of the applications. For example, a 220V AC line fed boost converter output DC voltage could be 380V or more. Therefore, a device output that must provide 48V DC for output load has to be stepped down. This is accomplished by using a high frequency DC-DC converter of section E. On the other hand, when a device must provide 100V high frequency AC to the output load, for example powering a fluorescent lamp, a high frequency DC-AC converter of section F is needed.

From the above, it is clear that after the AC rectification, the power conversion device of FIG. 1 consists of two distinct power conversion sections, namely, the combination of sections (C+D) and section E for DC-DC power conversion or the combination of sections (C+D) and section F for DC-AC power conversion. It is the goal of the present improved single stage power converter to replace any of these combinations by one section, commonly known as a single stage power converter. The obvious benefits of a single stage power converter are reduced device size, cost, and improved reliability. In many instances, it also yields higher overall power conversion efficiency.

Prior Art Gas Discharge Lamp Control Circuits

Figure 2A:
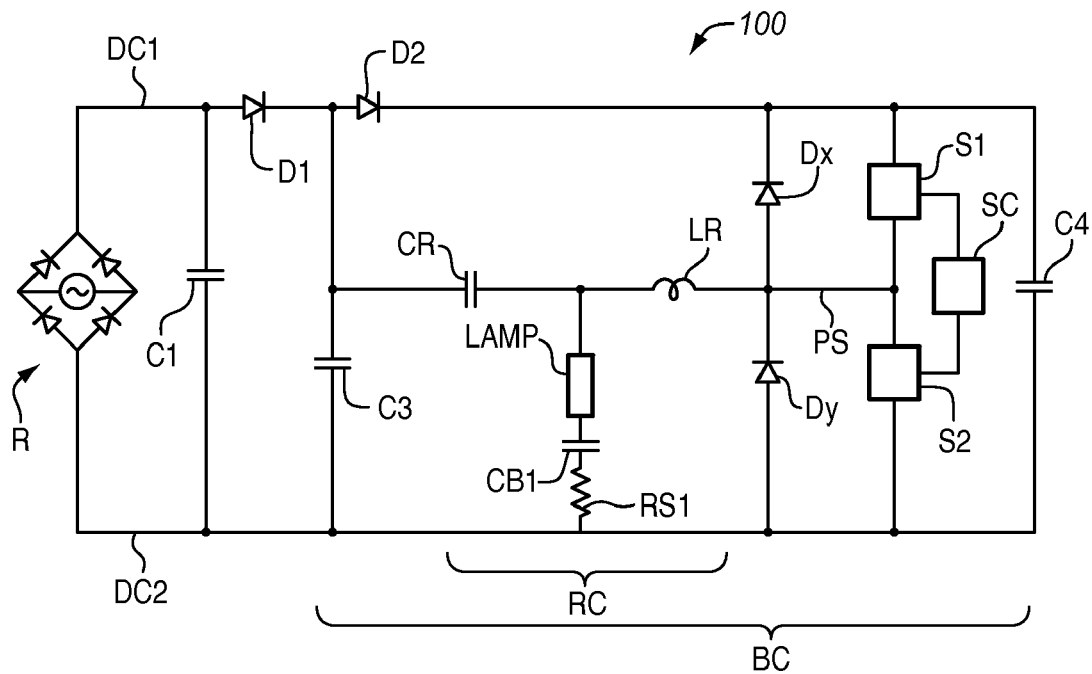
Figure 2B:
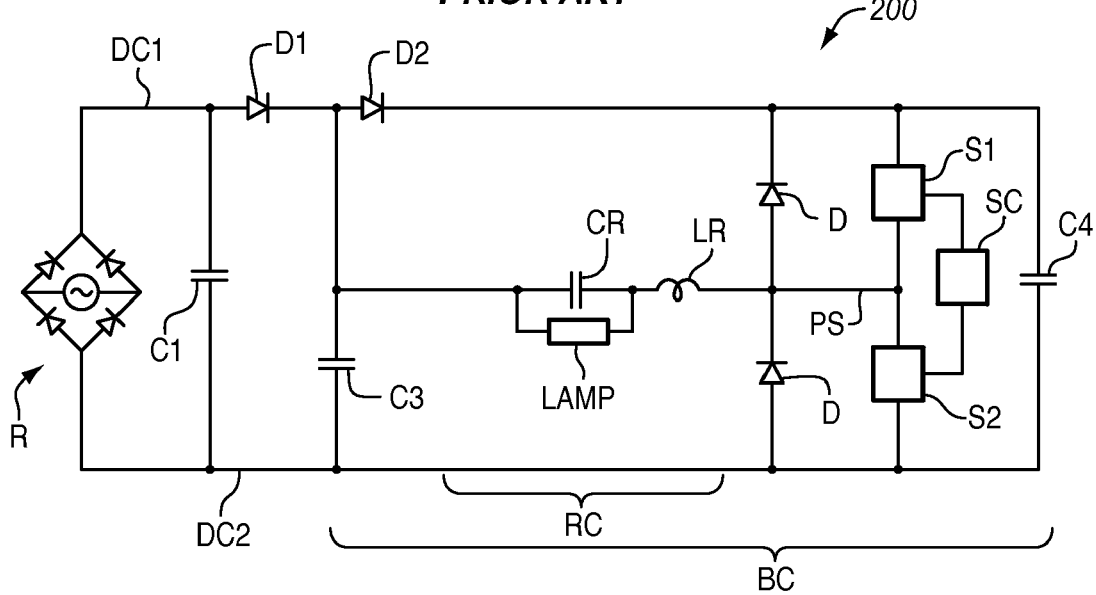

FIGS. 2A and 2B illustrate prior art gas discharge lamp control and DC-to-DC power supply circuits that are disclosed in U.S. Pat. No. 6,359,395 B1 and which incorporate active power factor correction.

Gas discharge lamps have negative resistance characteristics. Because of these physical characteristics, all gas discharge lamps are current controlled. However, even by maintaining a constant current in the lamp, lamp power cannot be controlled over the life of the lamp because the lamp voltage typically increases over the life of the lamp. This is particularly true for high-pressure sodium lamps. As a typical example, a 250-watt high-pressure sodium lamp (HPS), when new, has a nominal lamp voltage of 100V and requires the provision of a 2.5 A lamp current to achieve the nominal power output. After 15,000 hours of operation, this lamp voltage can increase to over 140V. In order to ensure constant lamp power and light output, the lamp current must be decreased accordingly. That is, the initial 2.5 A lamp current must be reduced to 1.785 A to maintain constant power, where power is the product of the lamp voltage and current applied to the gas discharge lamp.

Accordingly, the rectifiers R rectify the AC power. Capacitor C1 is a small high frequency filter capacitor. It is well known that during power conversions, high frequency noise is generated by power component switching actions within the device. The purpose of diode D1 is to prevent high frequency switching related circuit noise from conducting back to the AC line. The pair of power switches S1 and S2 is connected across the input lines in FIGS. 2A and 2B and switch alternately. The switching speed and on and off time periods are usually controlled by an integrated control circuit SC. The capacitor C4 is a large smoothing electrolytic capacitor. The diodes Dx and Dy are commutating diodes. The resistor RS1 in FIG. 2A is a current sense resistor. When an inductor LR and the capacitor CR are placed as shown in FIGS. 2A and 2B and when the switching frequency f is such that $f=1/2\pi\sqrt{(LR \times CR)}$, they form a resonant tank circuit.

Further, the gas discharge lamp control and DC-to-DC power supply circuits of FIGS. 2A and 2B both utilize a resonant topology, which is commonly known as parallel loaded series resonant topology. The primary difference between FIGS. 2A and 2B is that in FIG. 2A the load, LAMP, which is connected in parallel with the resonant capacitor CR, is returned to negative side, DC2, of the supply. On the other hand, in FIG. 2B, the load is returned to the junction of diodes D1 and D2. The circuit of FIG. 2B has major advantages as is described below. Nonetheless, among others, one of the advantages is that the entire load current and the current in the resonant capacitor CR are used for power factor correction. This is an efficient use of circuit energy for power factor correction. For the purpose of the present improved single stage power converter, the circuit arrangement of FIG. 2B is one of the preferred embodiments. However, the present improved single stage power converter is equally applicable to the circuit arrangement of FIG. 2A and including such known arrangements like parallel resonance, series, and series parallel resonance.

Figure 2C:
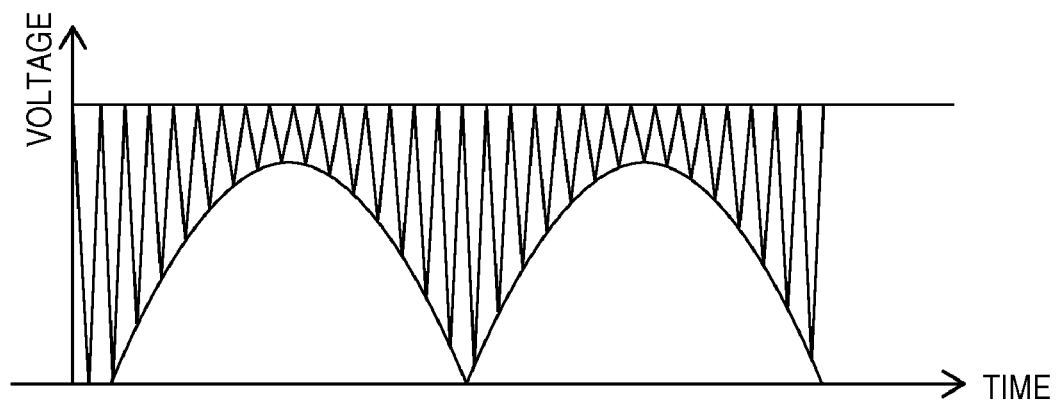
FIG. 2C illustrates a typical voltage waveform produced by these circuits.

In FIG. 2B, when the switch S2 closes, the energy in capacitor C and in the lamp is returned to the source via the current path DC2. On the other hand, when the switch S2 opens and the switch S1 closes, energy from the smoothing capacitor C4 flows into capacitor CR and in the load LAMP. The current into and voltage across capacitor CR and the load LAMP are substantially sinusoidal. The diode D2 is connected between diode D1 and smoothing capacitor C4. Under normal operating conditions, the voltage that appears at the junction of diodes D1 and D2 is shown in FIG. 2C Further, if diode D2 were short circuited, that is, if diode D1 were directly connected to smoothing capacitor C4, the voltage that would have appeared at this junction would be DC. However, because of the presence of high frequency time, varying voltages between the junction of diodes D1 and D2 yields high power factor by drawing power from AC line at all time.

Improved Single Stage Power Converter

Figure 3A:
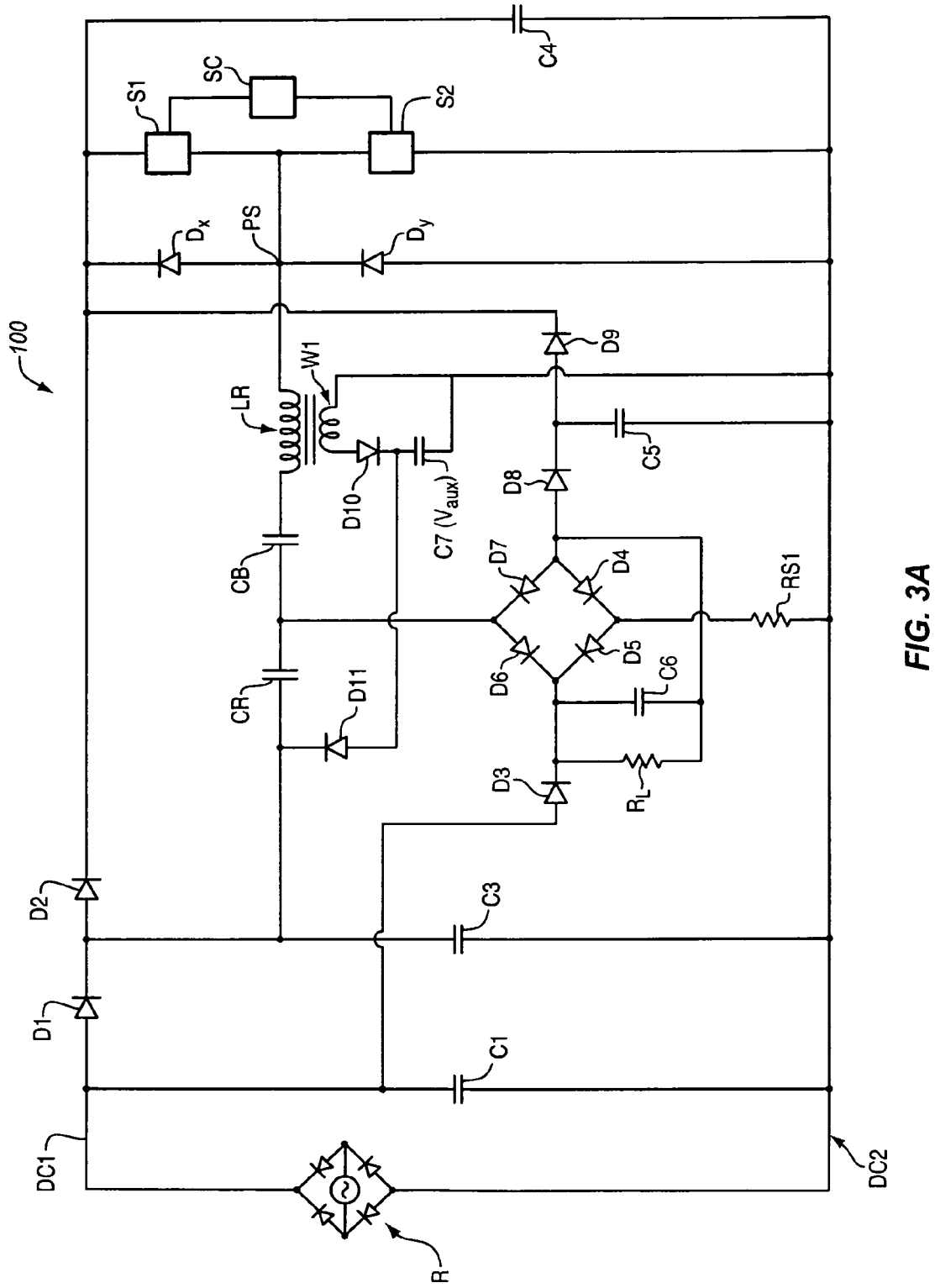
FIGS. 3A and 3B illustrate first and second embodiments of the present improved single stage power converter.
Figure 3B:
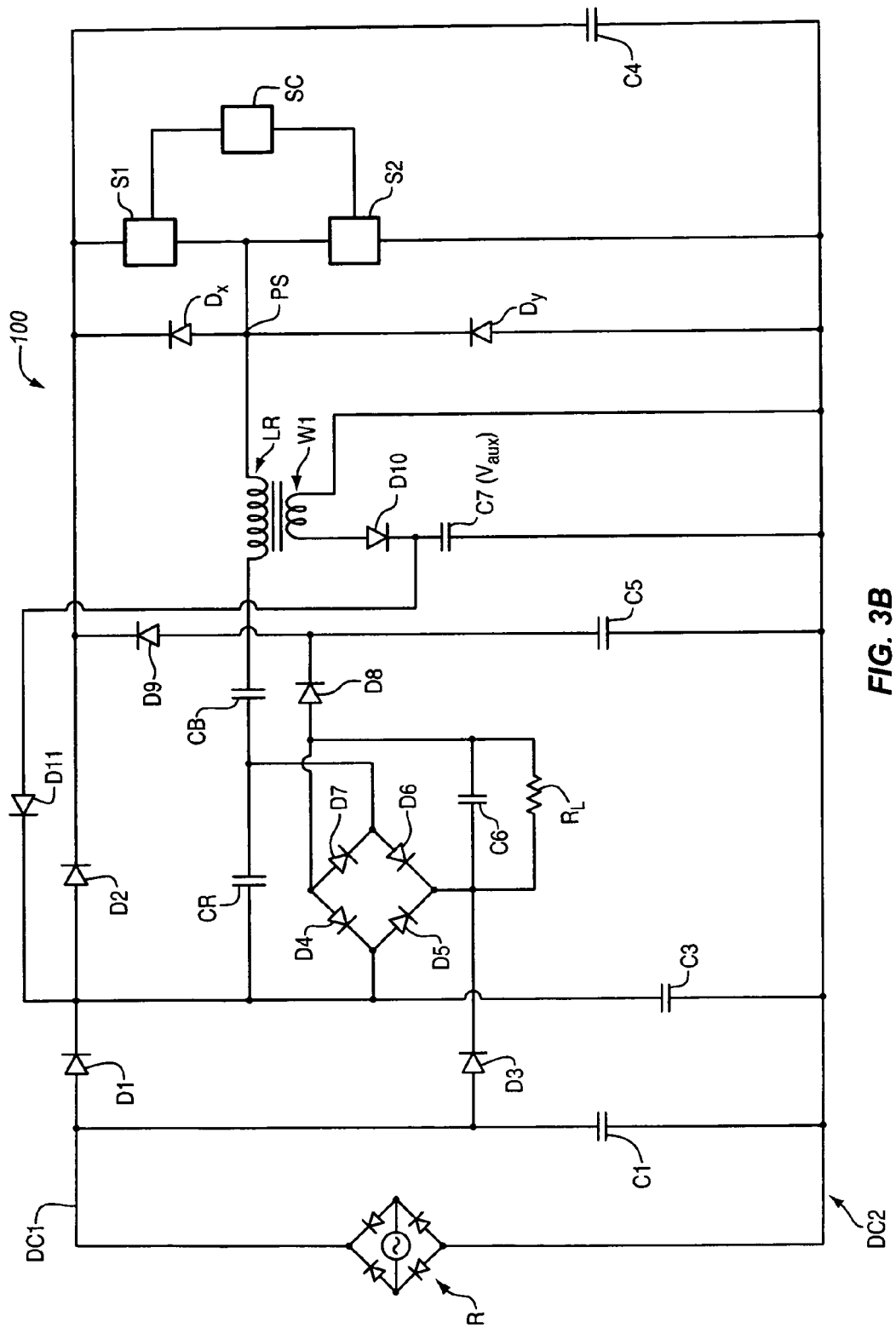

FIG. 3A is a first embodiment of the present improved single stage power converter, which constitutes an improvement over the prior art power factor corrected gas discharge lamp control circuit illustrated in FIG. 2A, and FIG. 3B is a second embodiment of the present improved single stage power converter, which constitutes an improvement over the prior art power factor corrected gas discharge lamp control circuit illustrated in FIG. 2B. The difference between FIGS. 2A and 2B are described earlier. The difference between FIGS. 3A and 3B are also the same. Even though FIG. 3A and other resonant circuit arrangements, such as series-parallel resonant circuits, maybe suitable in certain applications, the circuit arrangement of FIG. 3B is one of the preferred embodiments for an efficient and cost effective power converter.

In FIGS. 3A and 3B, the input AC rectifiers R, diodes D1 and D2, the power switches S1 and S2 connected across the input lines, the control circuit SC, the resonant inductor LR, the resonant capacitor CR, and capacitors C1, C3, and C4 have the identical functions as described above with respect to FIG. 2B. The diodes D4, D5, D6, and D7 are a full bridge high frequency rectifier that provides additional DC power to the load RL. The capacitor C6 is a high frequency filter capacitor for the output load. The value of this high frequency filter capacitor C6 may be as low as 1 uF for a 250 W High Pressure Sodium (HPS) lamp ballast inverter, for example. The capacitor C5 is also a small capacitor such as 0.1 uF. On the other hand, depending on the magnitude of the output load, the value of the smoothing capacitor C4 may be greater than 100 uF. Capacitor C5 is a DC blocking capacitor. Resistor RS1 is a current sensing resistor.

Assuming the value of capacitor C5 is 1 uF, and because it is connected in series with smoothing capacitor C4, a much larger value capacitor whose value may be higher than 100 uF, the effective series capacitance of capacitors C4 and C5 is less than 1 uF. Therefore, immediately following the application of the input AC power to the circuit of FIG. 3B, the charging current that flows from the AC line into the smoothing capacitor C4 is lower and its duration is significantly shorter simply because the input AC power source sees a much smaller capacitor as opposed to a much larger value smoothing capacitor C4. Therefore, the control circuit maintains the AC inrush current of short duration, and low magnitude at turn on is due to the fact that the input AC power source sees a small capacitor.

Auxiliary High Frequency AC Voltage Source

Further, the resonant inductor LR has a secondary winding W1. The voltage that is generated across winding W1 is high frequency AC. A voltage of magnitude of 1:5 with respect to the input AC line voltage peak value is sufficient. The high frequency AC voltage across winding W1 is rectified by a diode D10 to produce an auxiliary source of DC power for the load RL. This rectified DC voltage Vaux is smoothed out by a smoothing capacitor C7 and then fed back at the junction of diodes D1 and D2 with a series connected diode D11. Further, the rectified voltage Vaux can also be obtained by a full bridge rectifier arrangement or this voltage can be fed at the junction of diodes D4 and D5. It must be understood that within the power conversion device this auxiliary DC power source can also be created by other means such as use of a low power conventional buck converter. However, creating this power source from the winding W1 is certainly straightforward and cheaper. The auxiliary high frequency AC voltage source is used to produce the auxiliary DC power Vaux which is used in the present improved single stage power converter for the reduction of output ripples.

Figure 5:
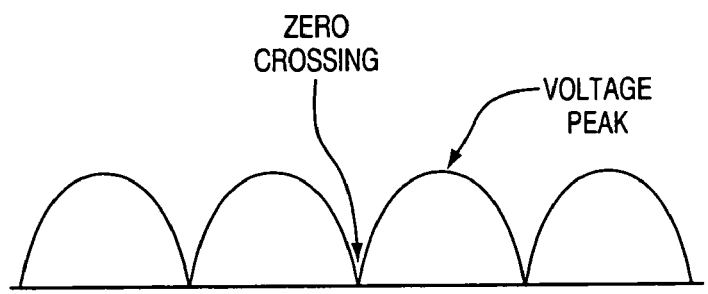
FIG. 5 illustrates a voltage waveform of the rectified DC sinusoids produced by the power factor corrected gas discharge lamp control circuits of FIGS. 3A-4D.
Figure 6:
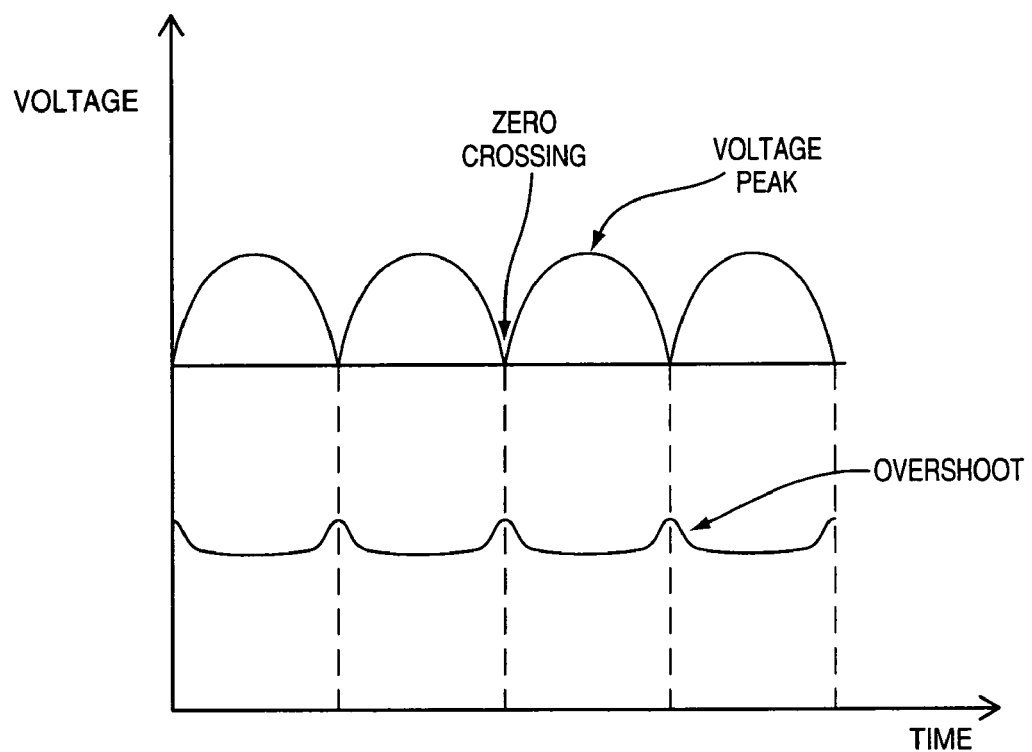
FIG. 6 illustrates a voltage waveform of the voltage ripples in relationship to rectified sinusoids produced by the power factor corrected gas discharge lamp control circuits of FIGS. 3A-4D.

The reduction of output ripples by the use of the auxiliary DC supply Vaux is explained as follows. Near the zero crossings of the input line AC voltage, the rectified DC sinusoids produced by rectifier R, as shown in FIG. 5, approach zero potential and cannot provide the required energy to the load RL. As a result, the resonant inductor LR, near the zero crossing of the input line AC voltage, tries to extract energy out of a very low voltage source, which causes certain overshoots. Therefore, the voltage that develops across the resonant capacitor CR also experiences certain overshoots. These overshoots inject a power ripple into the load RL at the rate of 120 Hz for 60 Hz AC input and at the rate of 100 Hz for 50 Hz AC input. The voltage ripples in relationship to rectified sinusoids are shown in FIG. 6. Therefore, the DC power source Vaux, when connected as shown in FIGS. 3A and 3B, acts as a secondary power source near zero crossings of the input line AC voltage.

In operation, the capacitor C7 gets fully charged rapidly near the peak of the DC sinusoids and delivers power to the load RL when the rectified DC sinusoid voltage drops below the value of Vaux. The benefits of this auxiliary DC power source are substantial. First, in AC applications when a load RL is connected directly across the resonant capacitor CR and powered by high frequency, the voltage ripples near zero crossings are substantially reduced. This eliminates power variation and flickering into the load RL near zero crossings of the input line AC voltage. Second, in DC applications, due to reduced ripples, the value of the output filter capacitor C6 can be substantially smaller. Therefore, in many applications, film capacitors may be used. Good quality film capacitors have longer life and much lower loss compared to electrolytic capacitors. Therefore, this increases device reliability and power conversion efficiency. Further, the use of a low value filter capacitor results in a faster response time for output load regulation. Third, when power switches S1 and S2 switch near zero crossings of the AC voltage present on the input lines, the power switches S1 and S2 experience additional switching noise as the power control feedback operates below resonance. It is well known that below resonance operation may cause momentary shorts between commutating diodes and power switches. Therefore, the application of Vaux not only reduces the switching related noise and heat dissipation but also improves overall Power Factor and Total Harmonic Distortion. Further, the application of Vaux also adds the overall output power delivery capacity by 4% to 5%.

Supplemental Current Source

In FIG. 3A, the diode D3, which is connected between the diode D1 anode and junction of the diodes D5 and D6, causes a somewhat higher energy flow into the load. Therefore, for a given design, diode D3 adds to the power conversion device approximately 5% more power delivery capacity into the output load.

Inrush Current Flow Limitation

During the normal operation, when switch S2 closes, energy flows into switch S2 through resonant inductor LR, capacitor CB, as well as diode D1 and resonant capacitor CR, through diode D4, load RL, and diode D6. However, as energy flows, primarily the load current that flows through diode D1, load RL, and diode D5 reaches the junction of the diodes D6 and D8, part of this energy also flows into smoothing capacitor C5 and thereby charges the smoothing capacitor C5. The voltage that is generated between the capacitors CR and CB with respect to circuit ground (lead DC2) is high frequency AC Therefore, the diodes D4, D5, D6, and D7 act as a bridge rectifier. The DC voltage that appears across the junctions D4-D5 is plus and D7-D6 is minus.

The charging current into smoothing capacitor C5 primarily depends on the impedance of the load RL, the lower the impedance the higher the charging current. During a no load situation, the current flow into smoothing capacitor C5 reduces almost to zero. The diode D8 prevents charging smoothing capacitor C5 directly from the AC line; however, once smoothing capacitor C5 is fully charged, it acts as a smoothing capacitor in parallel with C4.

Circuit Characteristics of the Improved Single Stage Power Converter

Because it is evident to anyone skilled in the art, the following are stated in reference to FIGS. 3A and 3B without giving individual drawings, except for the item #7:

1. For a power conversion device that requires delivering low power to the output load, one or all of the diodes D3, D4, and D7 can be eliminated.
2. High frequency bypass capacitors as snubber or for energy transfer optimization maybe added across any or each of the diodes D1 through D8, including one or more diodes maybe replaced by the capacitors.
3. The power switches S1 and S2 are part of a half bridge resonant inverter. A conventional full bridge resonant inverter can also be constructed and used for the delivery of higher output power.
4. Quasi-resonant circuits based on other topologies such as flyback topology may also be used.
5. The output power into the load can be regulated by such conventional techniques as Pulse Width Modulation (PWM) or by frequency modulation. Therefore, actual operating frequency may be different than resonant frequency.
6. The diode D1 maybe replaced by an inductor; however, the cost of an inductor is much more than a diode.
7. The resonant inductor LR and the resonant capacitor CR connections in FIG. 3B may also be connected and rearranged in various manners. Each of these alternatives may appear substantially different than the circuit arrangement of FIG. 3B and its foundation FIG. 2B. However, circuit analysis shows that various arrangements within the topology under the present improved single stage power converter yields the same circuit functions either at the expense of additional components or power conversion efficiency.

Figure 4A:
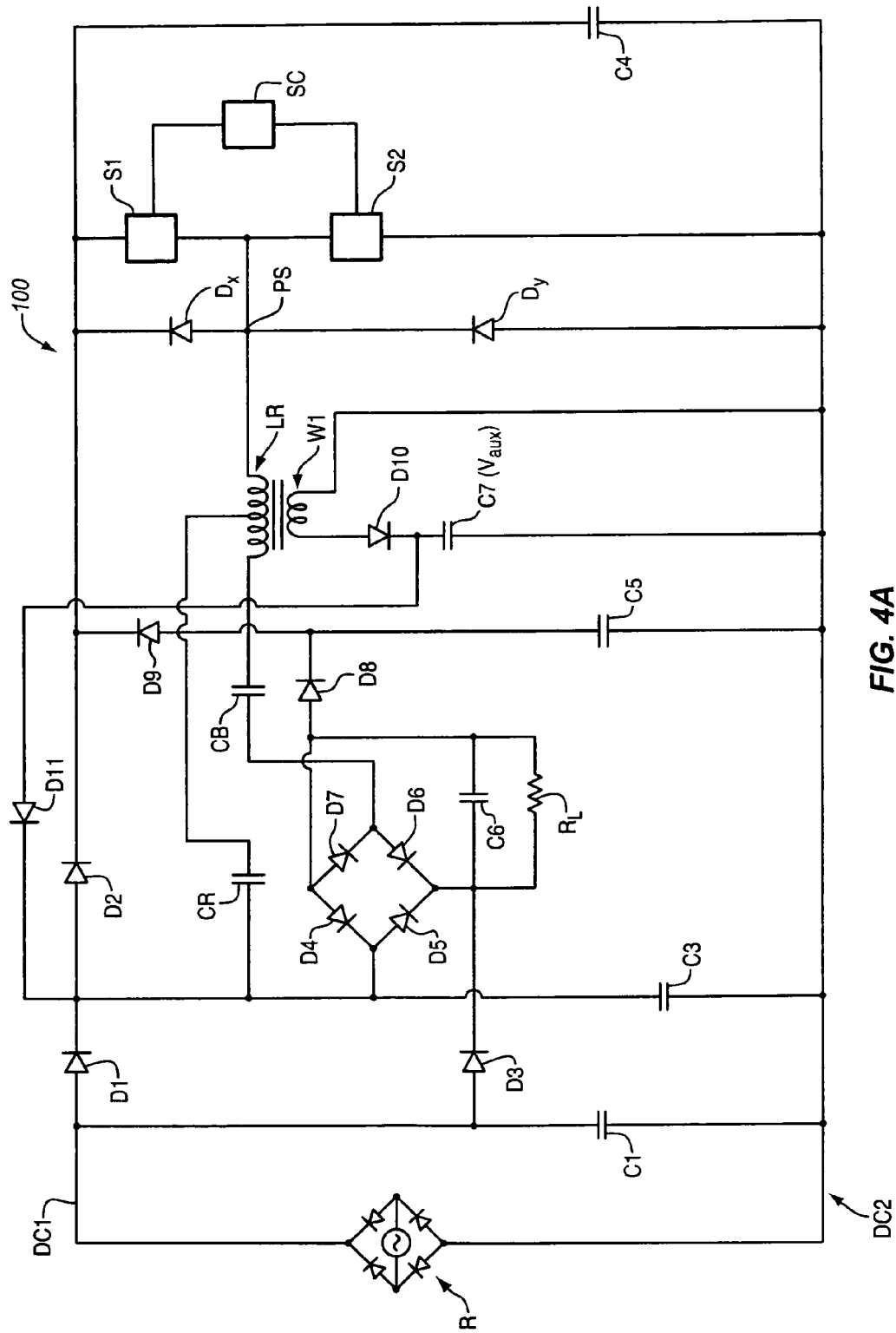
FIGS. 4A-4D illustrate alternative embodiments of the present improved single stage power converter.
Figure 4B:
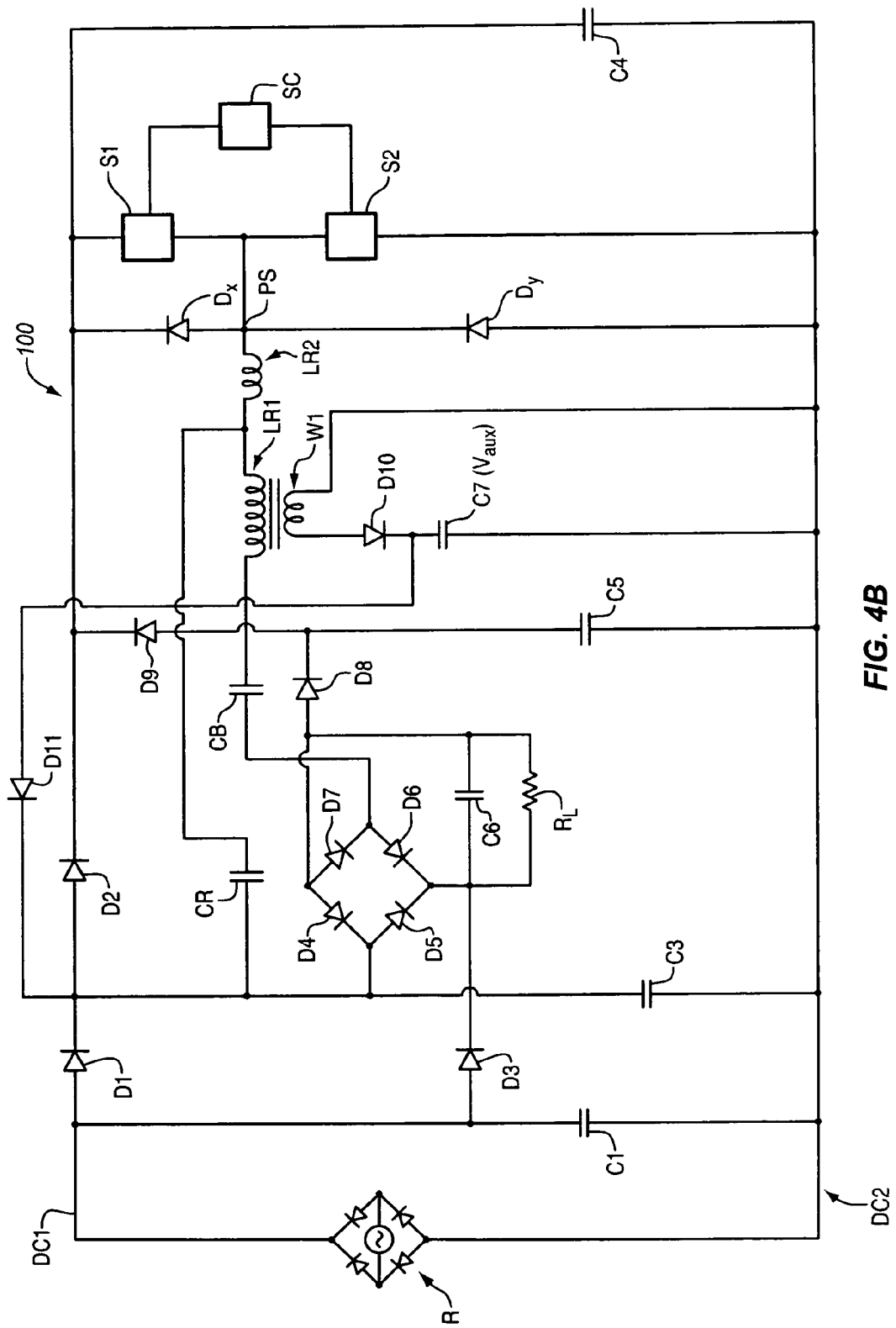
Figure 4C:
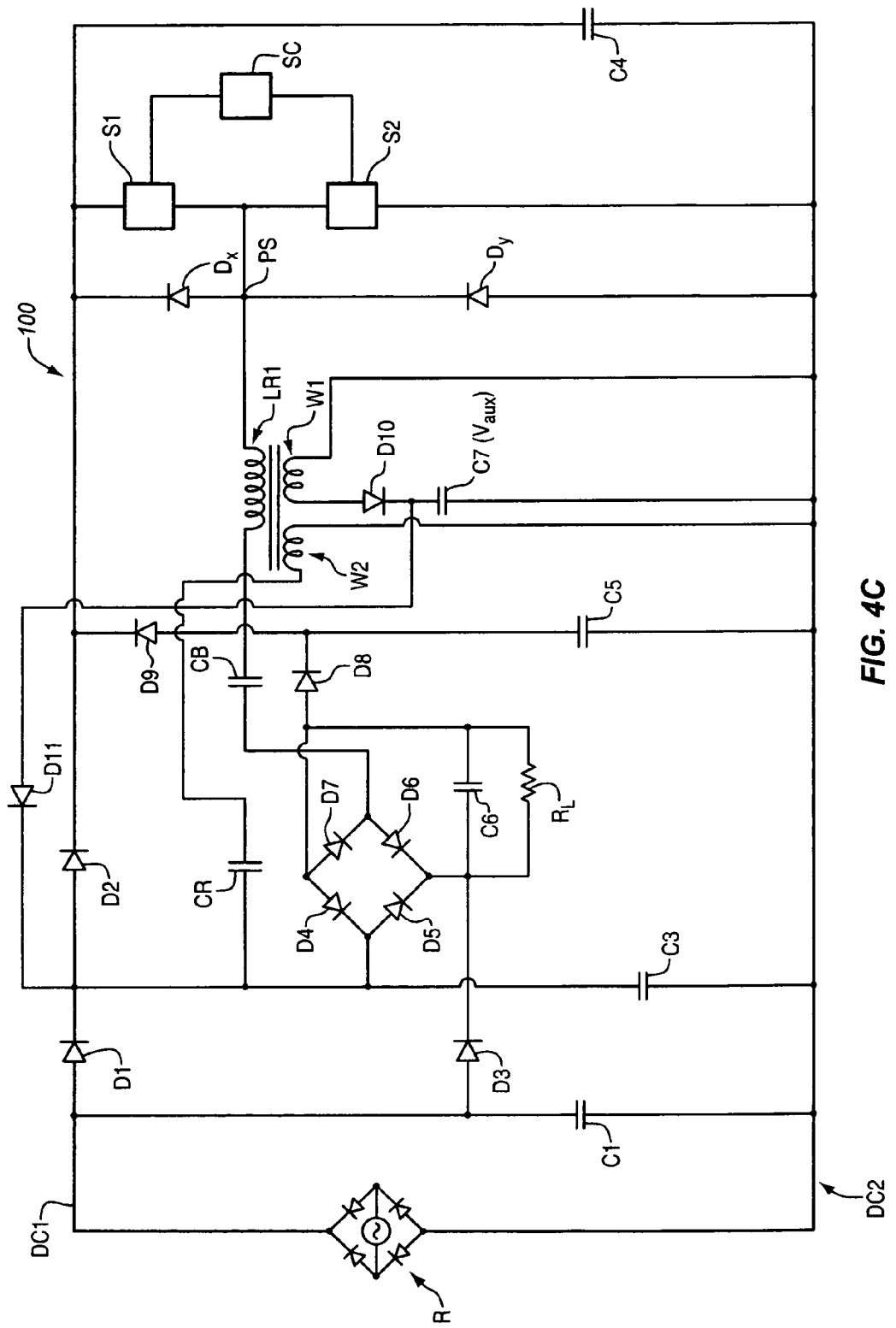
Figure 4D:
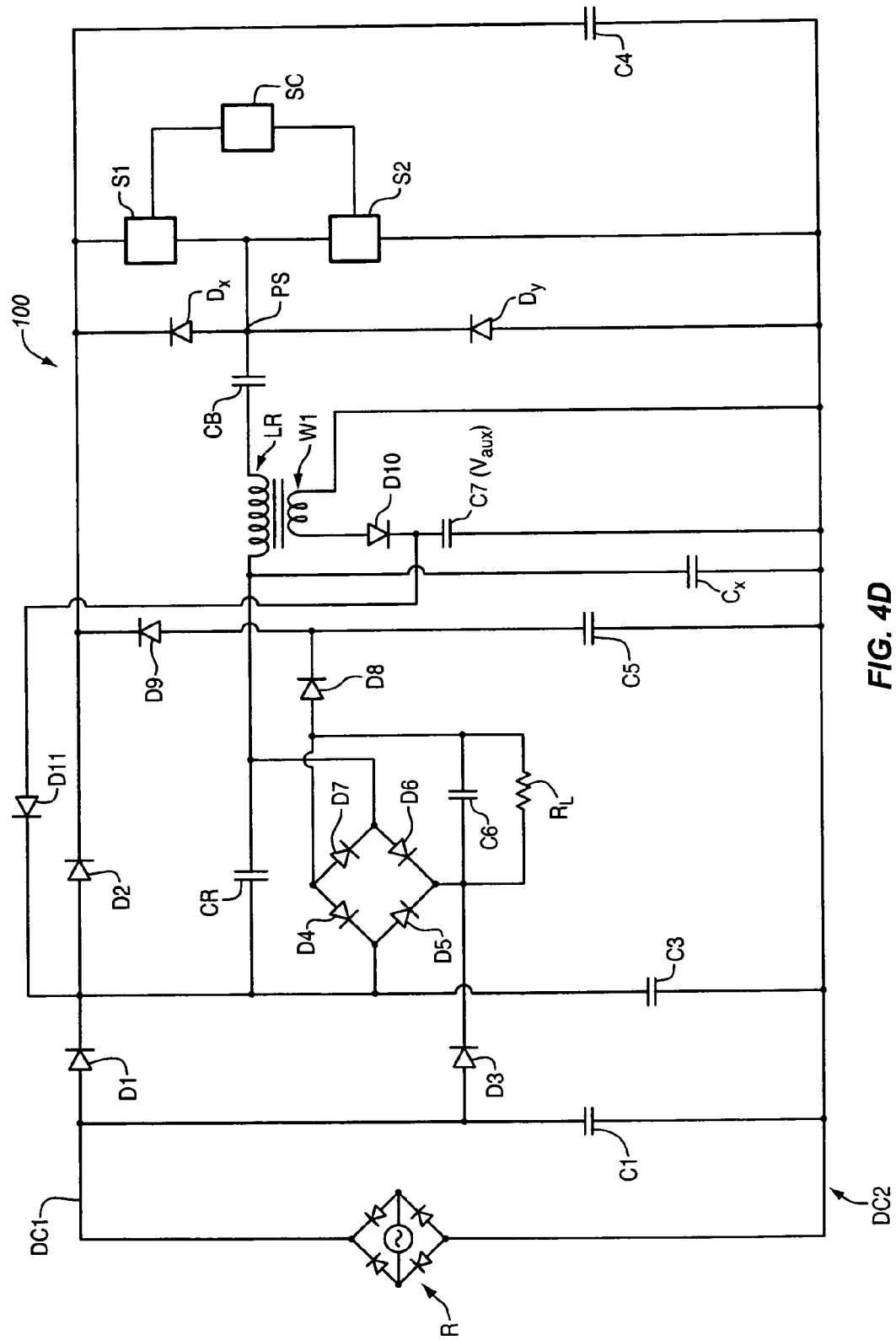

Nonetheless, in order to make this subject clear, a few variations are shown in FIGS. 4A, 4B, 4C, and 4D. In FIG. 4A, the resonant capacitor CR is connected to the junction of a divided winding on the same core material that constructs the resonant inductor LR. In FIG. 4B, the resonant capacitor CR is connected to the junction of two individual inductors, LR1 and LR2. Series combination of LR1 and LR2 forms the resonant inductor LR. In FIG. 4C, the resonant inductor LR has an additional secondary winding W2 for the purpose of connecting CR between the device negative terminal DC2 and the junction of diodes D1 and D2. In FIG. 4D, a capacitor Cx is connected between the junction of CR and LR and the device negative terminal DC2.

Alternative Improved Single Stage Power Converters

Figure 7:
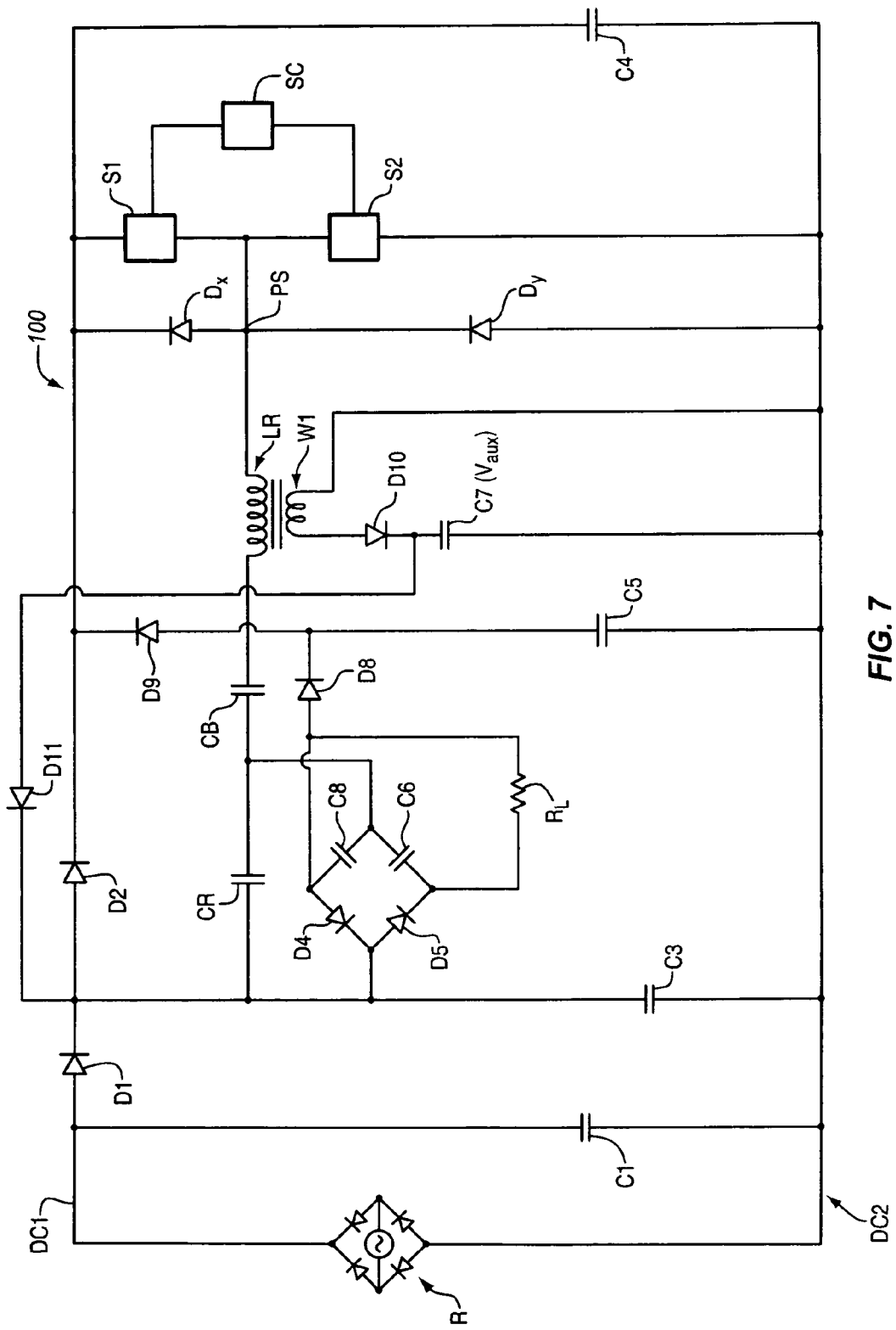
FIG. 7 illustrates a variation of the power factor corrected gas discharge lamp control circuit of FIG. 3B.

Further, FIG. 7 illustrates a variation of the power factor corrected gas discharge lamp control circuit of FIG. 3B and also one of the preferred embodiments of the present improved single stage power converter. In this case, the diodes D4 and D6 provide full wave rectification of the output high frequency AC. Capacitors C6 and C8 are high frequency filter capacitors for the output load, RL. Since the rectified output voltage across the load is twice the voltage that appears across capacitor C6 in series with capacitor C8, the arrangement of FIG. 7 under the present improved single stage power converter is particularly suitable for an off line application for high impedance output load such as lower wattage HID lamps.

Figure 8:
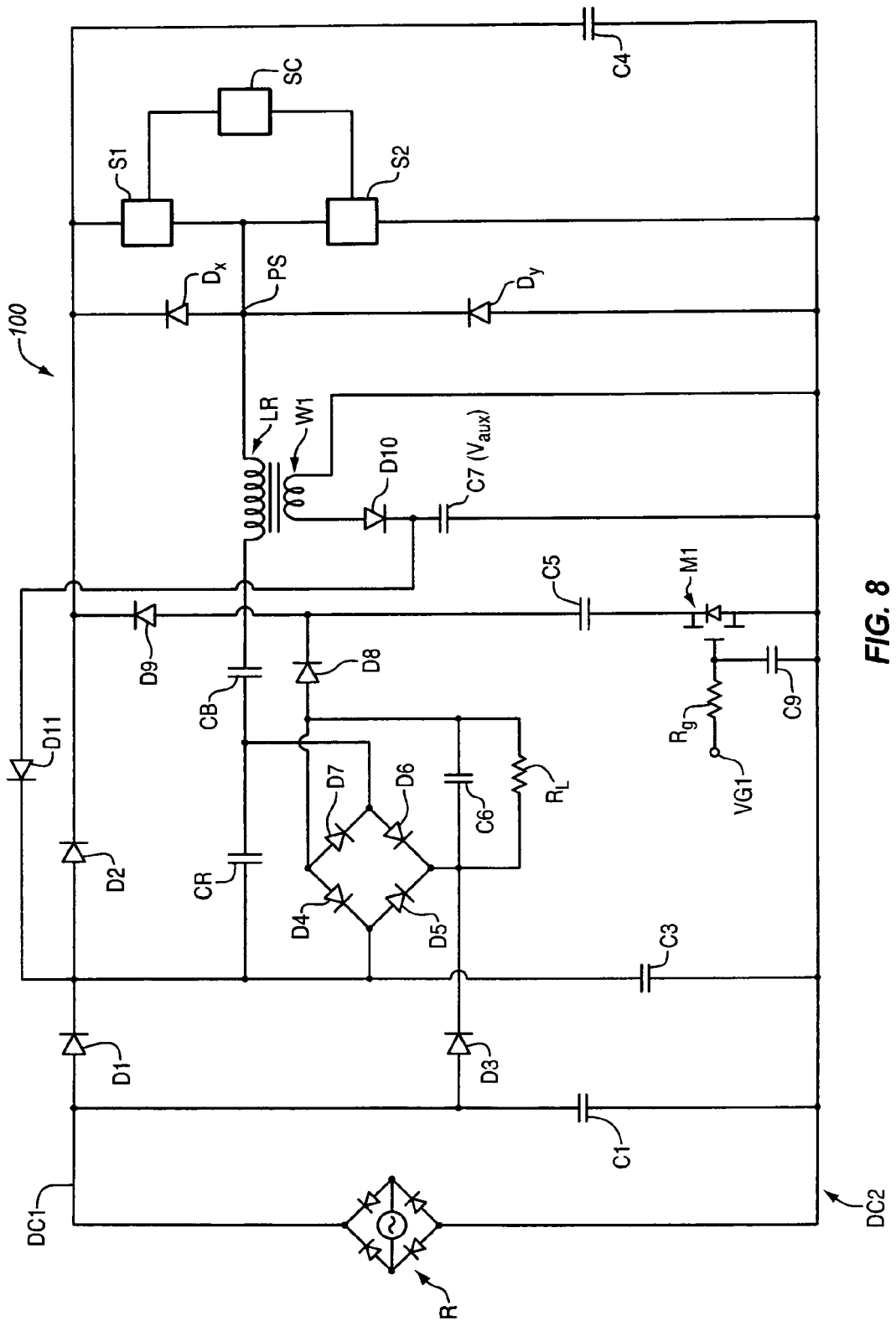
FIG. 8 illustrates a variation of the power factor corrected gas discharge lamp control circuit of FIG. 3B.

Further, in many DC applications, very low output ripples are desirable, in which case the value of filter capacitor C6 of FIG. 3B must be increased. However, higher value filter capacitor causes higher AC inrush. FIG. 8, which is a variation of FIG. 3B, is another method of reducing AC inrush. This can be achieved by adding a power switch such as an IGBT or MOSFET type of device in series with capacitor C4. For low circuit loss, the MOSFET type of device is a preferred choice. In FIG. 8, a MOSFET M1 is connected in series with the capacitor C4. When the MOSFET M1 is in off state, it offers very high impedance. On the other hand, depending on the particular MOSFET device selected, its on state can offer impedance as low as several milliohms. Therefore, the circuit of FIG. 8 is constructed such that the MOSFET M1 is turned on not only after the initial application of AC power but also after several cycles of operation of the switches S1 and S2. One of the convenient ways this can be accomplished by delayed turn on of the MOSFET M1 is by adding a small value capacitor C9 across the gate and source of MOSFET M1 and by connecting a series resistor Rg between the gate of MOSFET M1 and the turn on voltage source VG1. The voltage source VG1 maybe, but is not limited to, the same low voltage DC that powers the control circuitry SC. During a momentary AC power interruption, the MOSFET M1 can be turned off quickly by various known techniques, including placing a turn off diode across the resistor Rg. Further, a high value resistor maybe added across the drain and source of the MOSFET M1.

It must be noted that limiting AC inrush by using the turn on characteristics of MOSFET devices is not new. However, what is new is the application of MOSFET devices as an inrush current limiter in a power factor corrected single stage power conversion.

Figure 9:
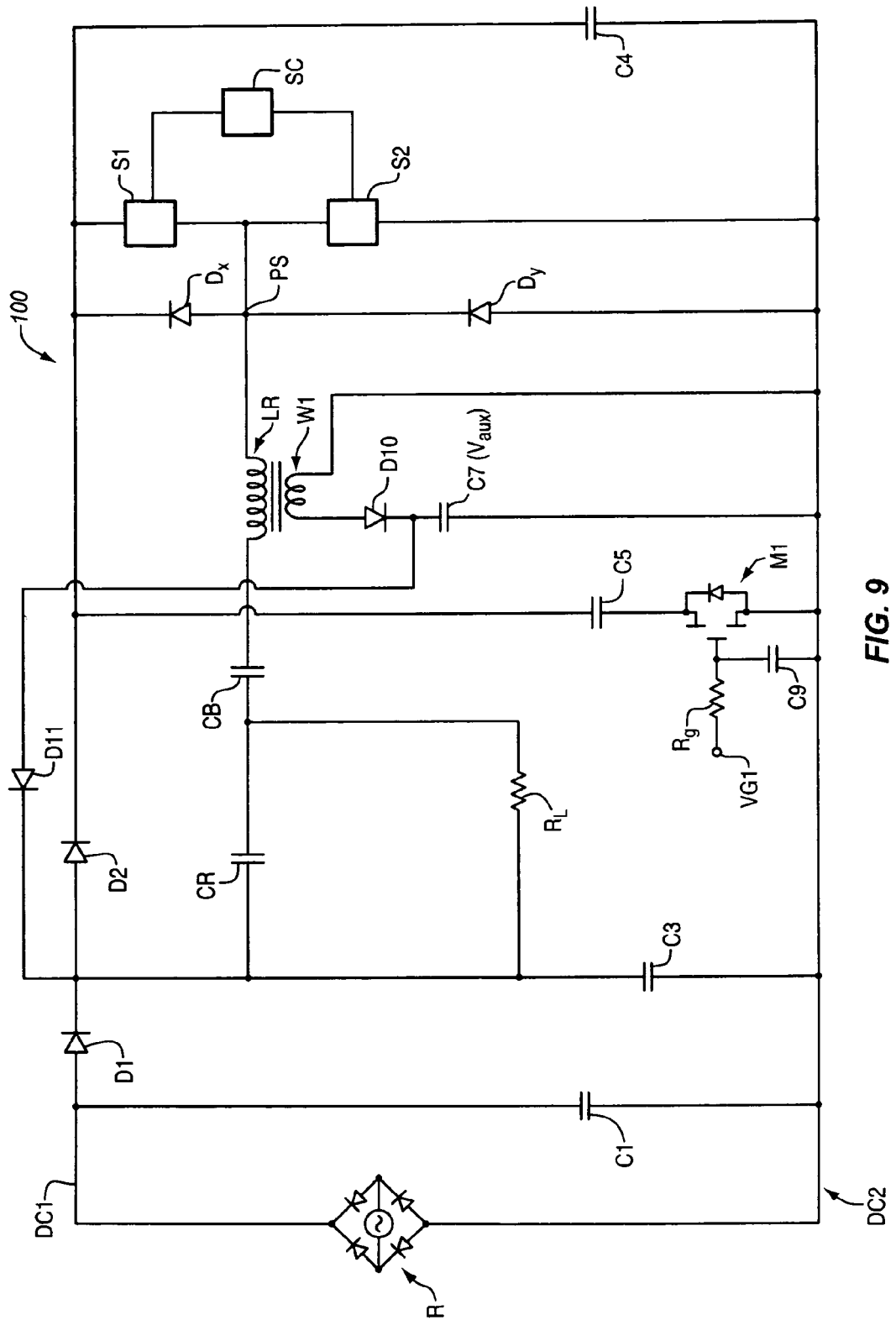
FIG. 9 illustrates a variation of the power factor corrected gas discharge lamp control circuit of FIG. 8 when a load is connected directly across the resonant capacitor.

Further, the scheme of FIG. 8 can also be used when a load is operated by high frequency AC power. This is illustrated in FIG. 9 where a load is connected directly across resonant capacitor CR and in FIG. 10 where the load is a transformer TR. The transformer output may be used to power a load with AC power or power with DC by rectifying the high frequency AC. Further, for low voltage DC rectifications in place of conventional diodes, low loss rectification topologies like synchronous rectifications using power MOSFET devices can also be used.

Figure 10:
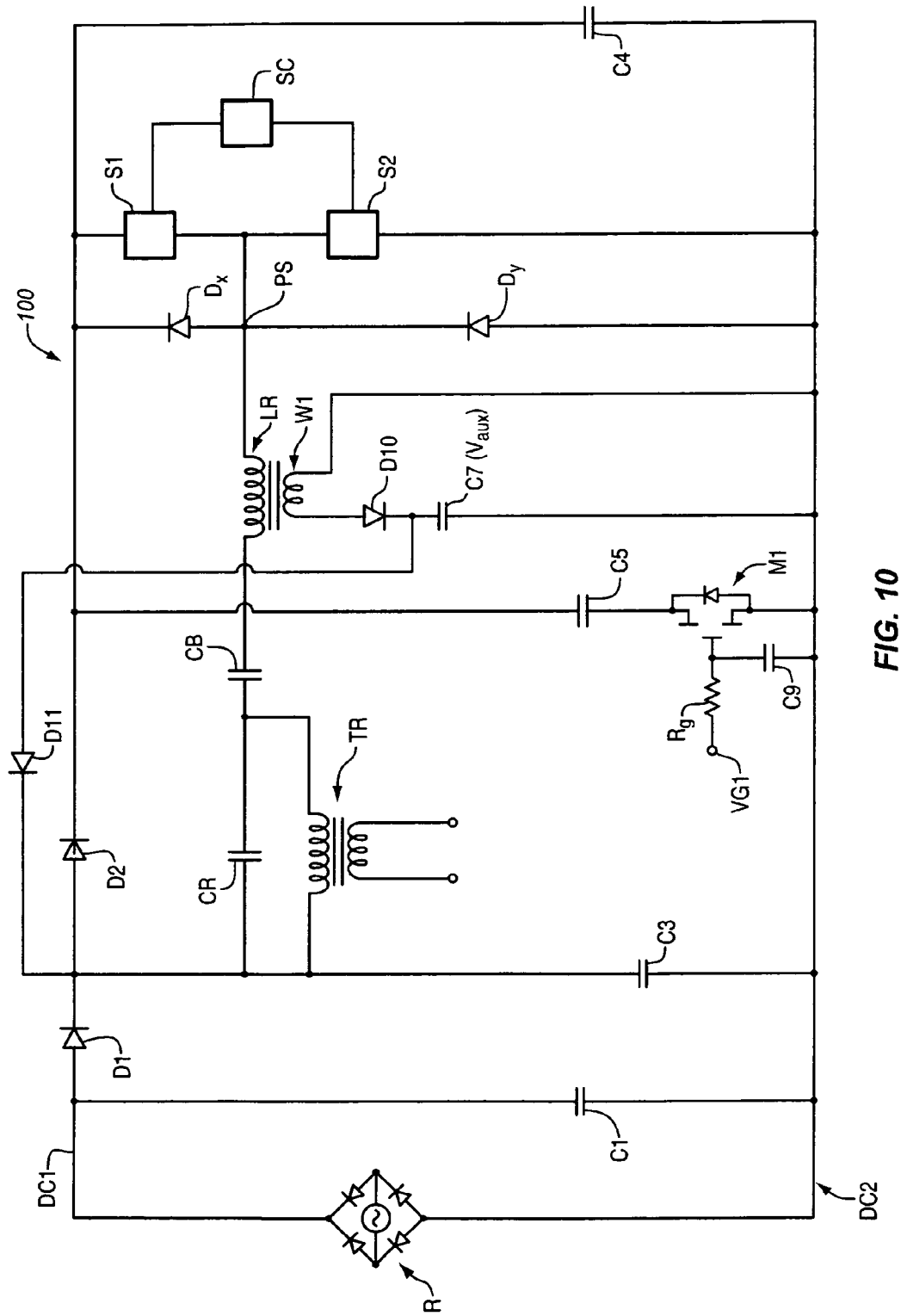
FIG. 10 illustrates a variation of the power factor corrected gas discharge lamp control circuit of FIG. 8 when a transformer is connected across the resonant capacitor for feeding an isolated AC or DC output load.
Figure 11:
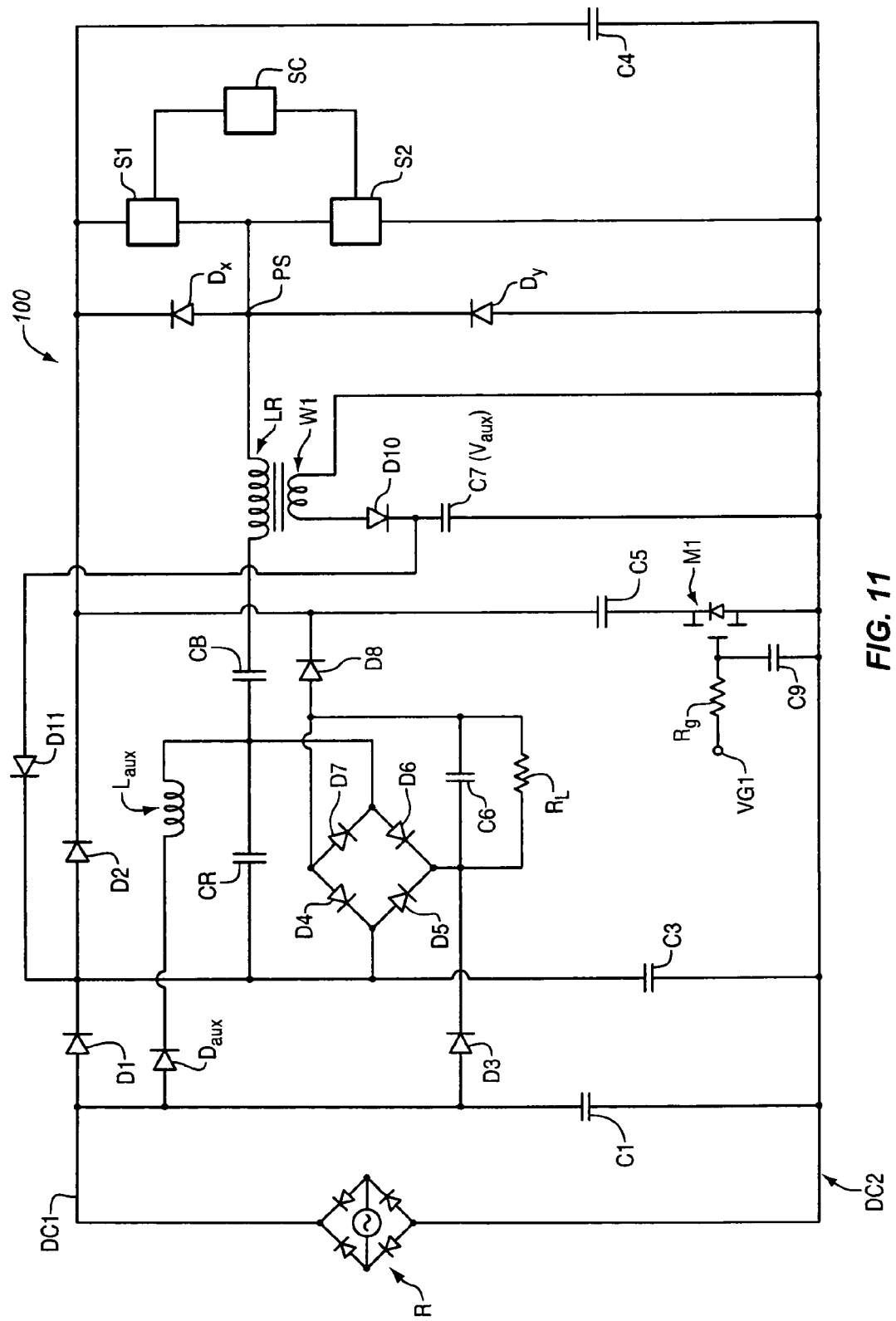
FIG. 11 illustrates a variation of the power factor corrected gas discharge lamp control circuit of FIG. 8.
Figure 12:
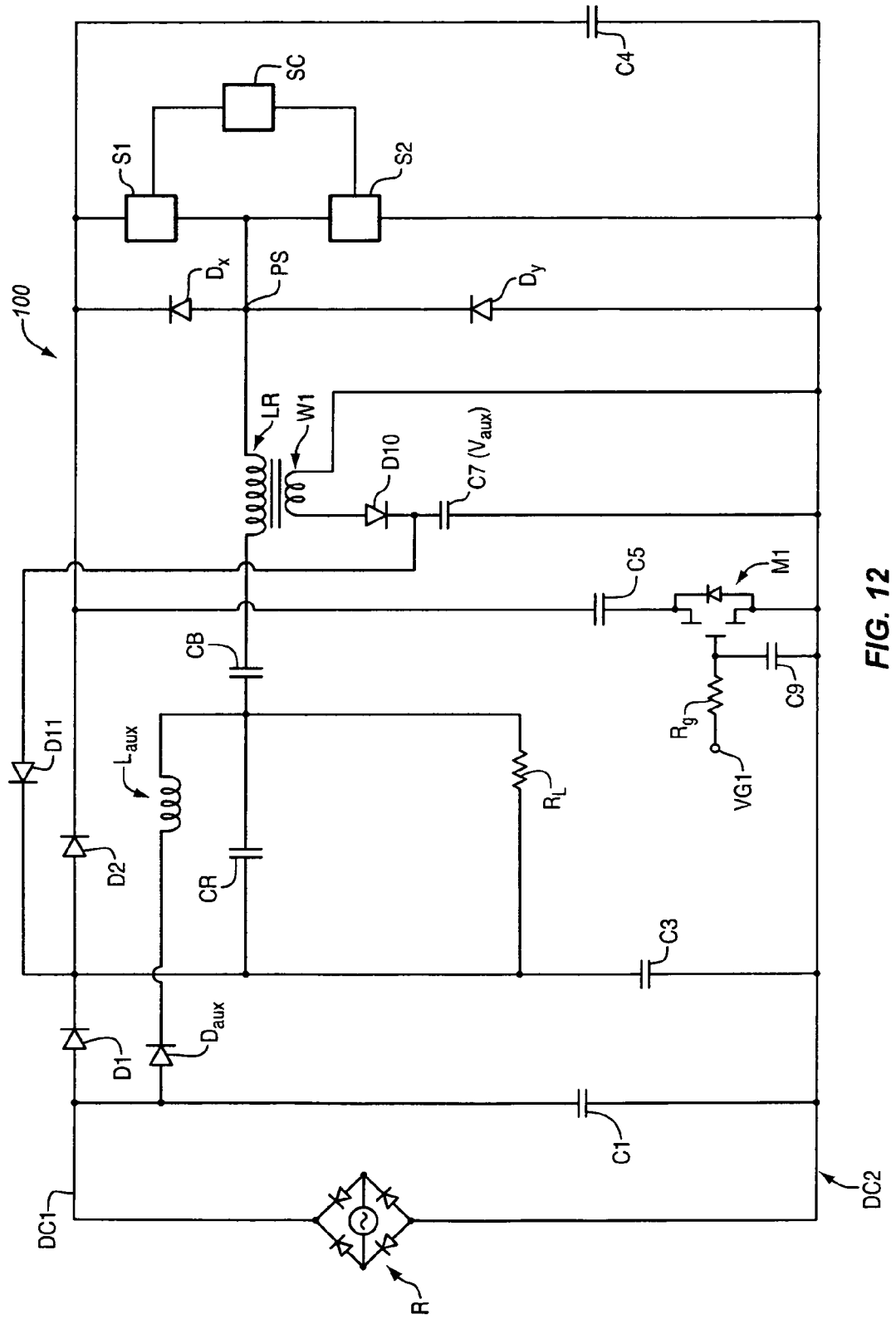
FIG. 12 illustrates a variation of the power factor corrected gas discharge lamp control circuit of FIG. 9.
Figure 13:
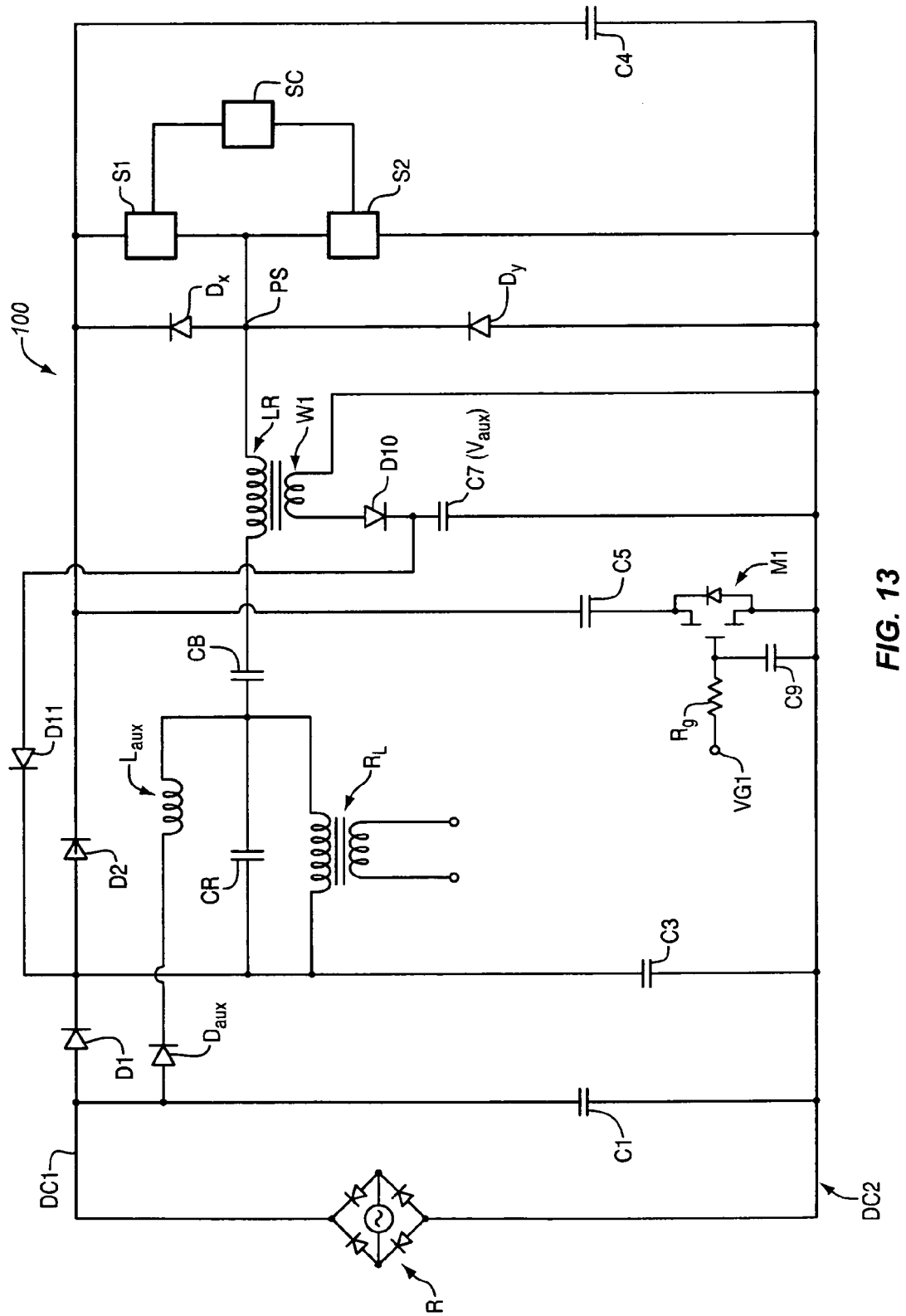
FIG. 13 illustrates a variation of the power factor corrected gas discharge lamp control circuit of FIG. 10.

Further, FIGS. 11, 12, and 13 are variations of FIGS. 8, 9, and 10, respectively. The explanation of FIG. 11 sufficiently explains the others. In FIG. 11, an additional inductor Laux and a diode Daux are added between the anode of diode D1 and the junction of the resonant capacitor CR and the DC blocking capacitor CB. This addition adds to overall device power delivery capacity at the expense of adding an additional inductor. This can be explained as follows. In FIG. 11, during the S2 turn on period, energy is stored in inductor Laux. After switch S2 turns off, the inductor energy is delivered to the smoothing capacitor C5. The diode Daux prevents energy flow in the inductor during switch S1 turn on period.

Further, power regulations are required in any power converter for providing a controlled power into the output load. Not only is this required because the input AC line voltage varies, but also because the output load characteristics do not remain the same at all times. Power regulations are nominally accomplished in switched mode power conversions either by PWM or by frequency modulation techniques. For high output power delivery capability, the preferred method of regulations under the present improved single stage power converter is frequency modulation technique. This is due to the fact that, in particular, in order to compensate for a large increase of the input AC line voltage, under PWM technique, the duty cycle must be reduced. As a result, this causes significant increase of peak current into the power components such as switches S1 and S2. Because of this, not only the power conversion efficiency will decrease but also excessive heat dissipation within the switches may cause device failure. On the other hand, under frequency modulation technique, increasing the operating frequency regulates the output power. As a result, the current into the switches remains fairly constant.

Output Power Regulation

Primarily, three types of output power regulation are required. They are described below.

Figure 14:
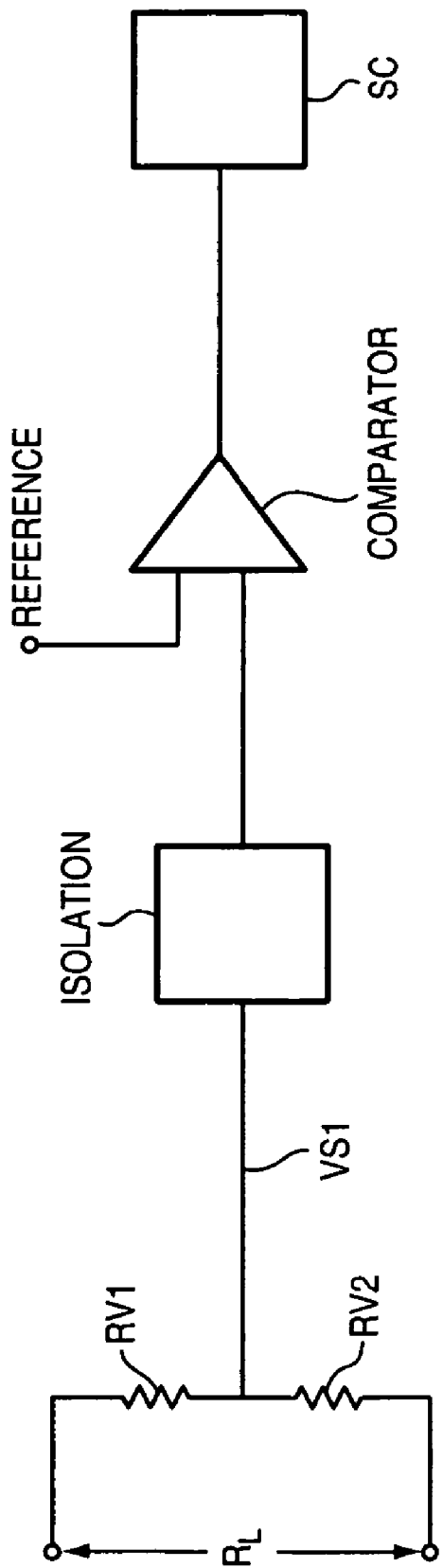
FIG. 14 illustrates a comparator and a feedback control circuit.

Mode A—Regulation for Maintaining Constant Output Voltage:

In this case, the magnitude of the output high frequency AC voltage across the resonant capacitor CR of FIG. 9 or rectified DC voltage of FIG. 3B that provides power to the load must be maintained with respect to line voltage variations. This can be accomplished by simply measuring the voltage across the output load by adding a resistor divider network. This is conventionally called voltage sensing by resistive means. The sense voltage is then fed to a comparator for comparing with a reference voltage. Comparator circuits are well known, but for clarity, a block diagram of a suitable comparator circuit is shown in FIG. 14. By placing the resistors RV1 and RV2 across the output load RL, a scaled output voltage can be measured. Voltage VS1 is the scaled sense voltage that appears at the junction of resistors RV1 and RV2. Upon comparing, the comparator output is then fed to an error amplifier in the control circuit SC for a closed loop control of output DC voltage. This can be accomplished by the modulation of the operating frequency of the resonant circuit, that is, the switching frequency of switches S1 and S2 in FIGS. 3B and 9. It must be noted that the control circuit SC is usually referenced to circuit ground, that is, DC2. In this case, the sense voltage VS1 requires isolation. Isolation techniques are well known. Optical and transformer based isolations are two popular examples.

Figure 15A:
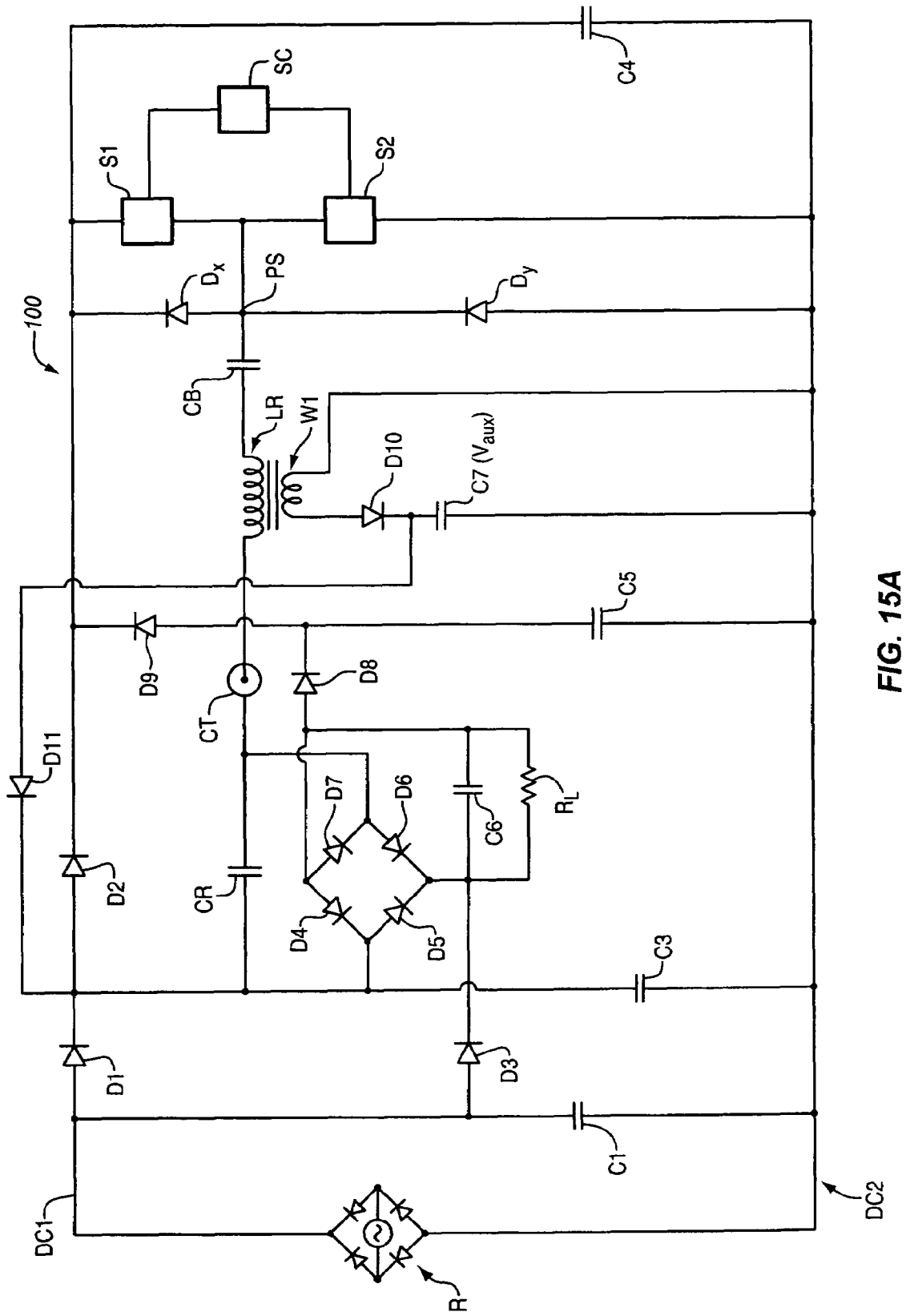
FIGS. 15A and 15B illustrate the use of a current sense transformer in the circuits of FIG. 3B and FIG. 9, respectively.
Figure 15B:
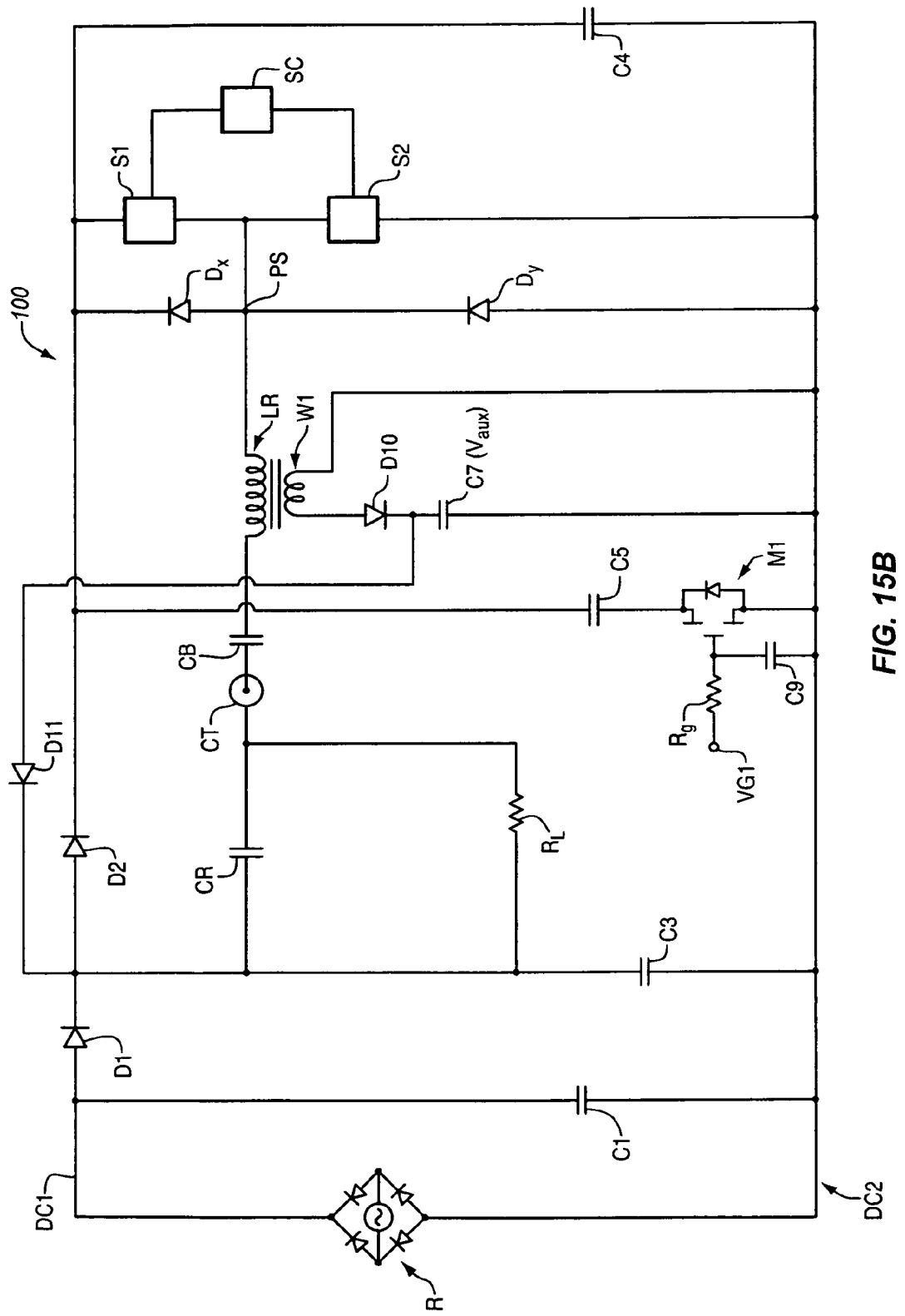

Mode B—Regulation for Maintaining Constant Power in a Non-Varying Output Load:

If output load characteristics remain fixed at all times, then the only variable is the AC input voltage. In this case, constant power in the load can be maintained by the same method as in the case for Mode A. Nonetheless; this can also be accomplished by sensing the total current in the resonant tank circuit, that is, by sensing the sum of capacitor CR and output load current. A high frequency current sense transformer, CT, can be placed in a convenient location for loss less current sensing. Two examples of placing a current sense transformer Figure in 3B type of scheme is shown in FIG. 15A, and a FIG. 9 type of scheme is shown in FIG. 15B. Depending on the amount of load current, the current sense transformer generates an isolated voltage that is representative of the sense current. Therefore, this sense voltage now becomes VS1 in FIG. 14. Further, the output power regulation by total current sensing method has another advantage; that is, it can also be used for detecting short circuit or overloading conditions.

Further, by implementing the output power regulation described above with respect to modes A and B an efficient and reliable battery charger can be built.

Mode C—Regulation for Maintaining Constant Power in a Nonlinear Load:

There are many applications where the load changes it characteristics. A FPS lamp is an example. A new 250 W HPS lamp has the following nominal characteristics: lamp voltage ~100V and lamp current ~2.5 A. That is, the lamp impedance of ~100V/2.5 A=40 ohms. On the other hand, the same HPS lamp as it gets older changes it characteristics continuously. Towards the end of its life, the lamp voltage may reach 150V. Therefore, in order to maintain a constant power in the lamp, the current must be reduced to ~1.67 A. In this case, the lamp impedance is ~89.8 ohms. Furthermore, the power conversion device must also take into account for the AC line voltage variations.

Figure 16:
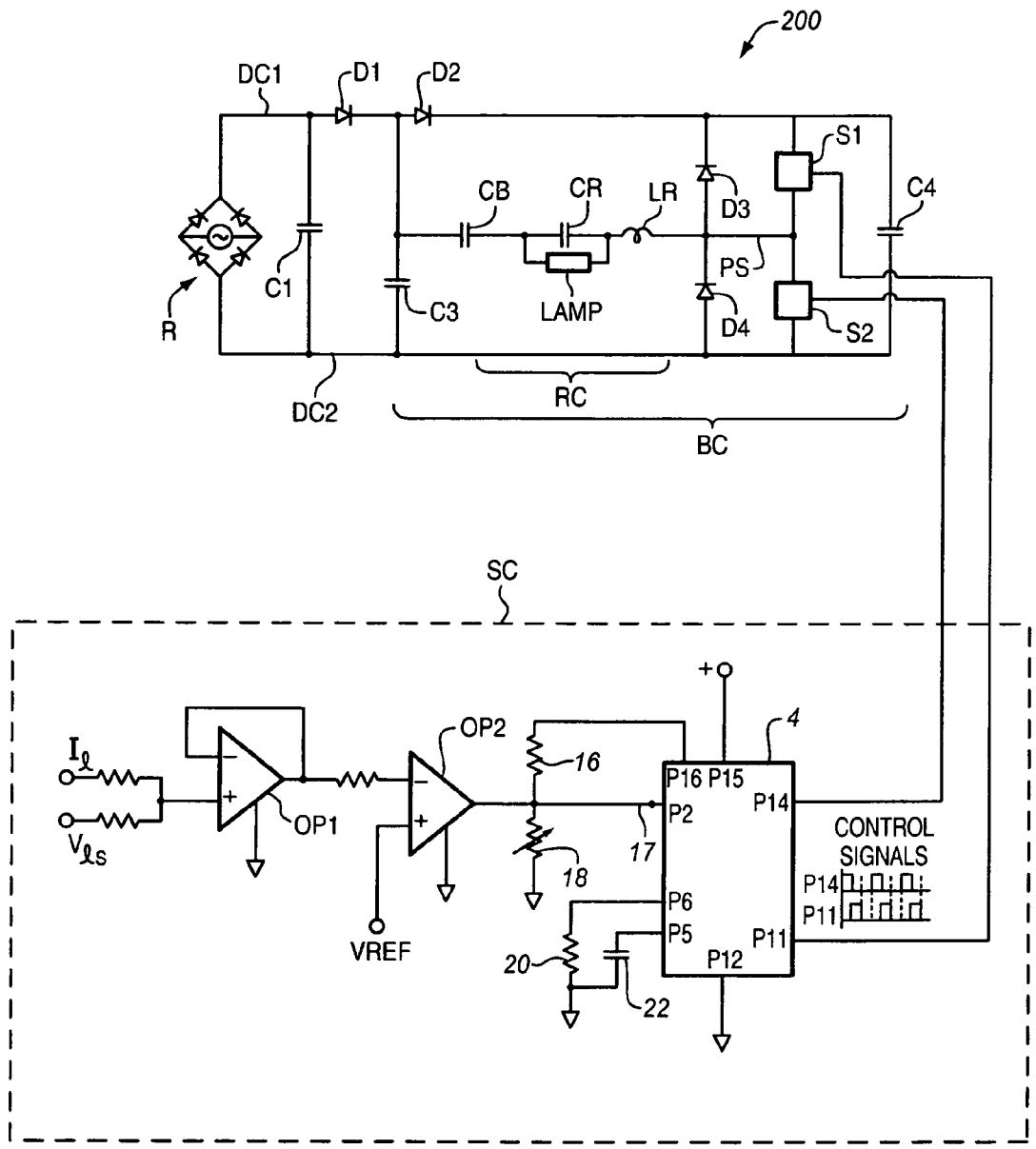
FIG. 16 illustrates a prior art constant power control circuit.

For maintaining a constant power in a nonlinear load, both the output load current, that is the lamp current, and the lamp voltage must be measured. These measured quantities, conventionally, are multiplied by a multiplier for providing a feedback signal to the control circuit SC for a close loop control. However, U.S. patent application Ser. No. 11/111,005 discloses a new cost saving method whereby a scaled lamp current and a scaled lamp voltage when added together, rather than multiplying, can be used as a feedback control signal to the control circuit SC for maintaining a constant power in a nonlinear load. This is shown in FIG. 16, which is FIG. 1 of U.S. patent application Ser. No. 11/111,005 with an addition of a DC blocking capacitor CB. Further, it is important to note that, for a nonlinear load, the voltage that appears across the load is not regulated. It is the load current and the load impedance that determine the load voltage. Therefore, the same constant load power control loop also maintains constant power into the load with respect to AC line voltage variations. This is simply because, as the line voltage varies, power in the load varies, which is the same as if load characteristics are varying. Further, as disclosed in U.S. patent application Ser. No. 11/111,005, Mode C operation also allows precision dimming control in the case the output load is a fluorescent or HID lamp.

Figure 17A:
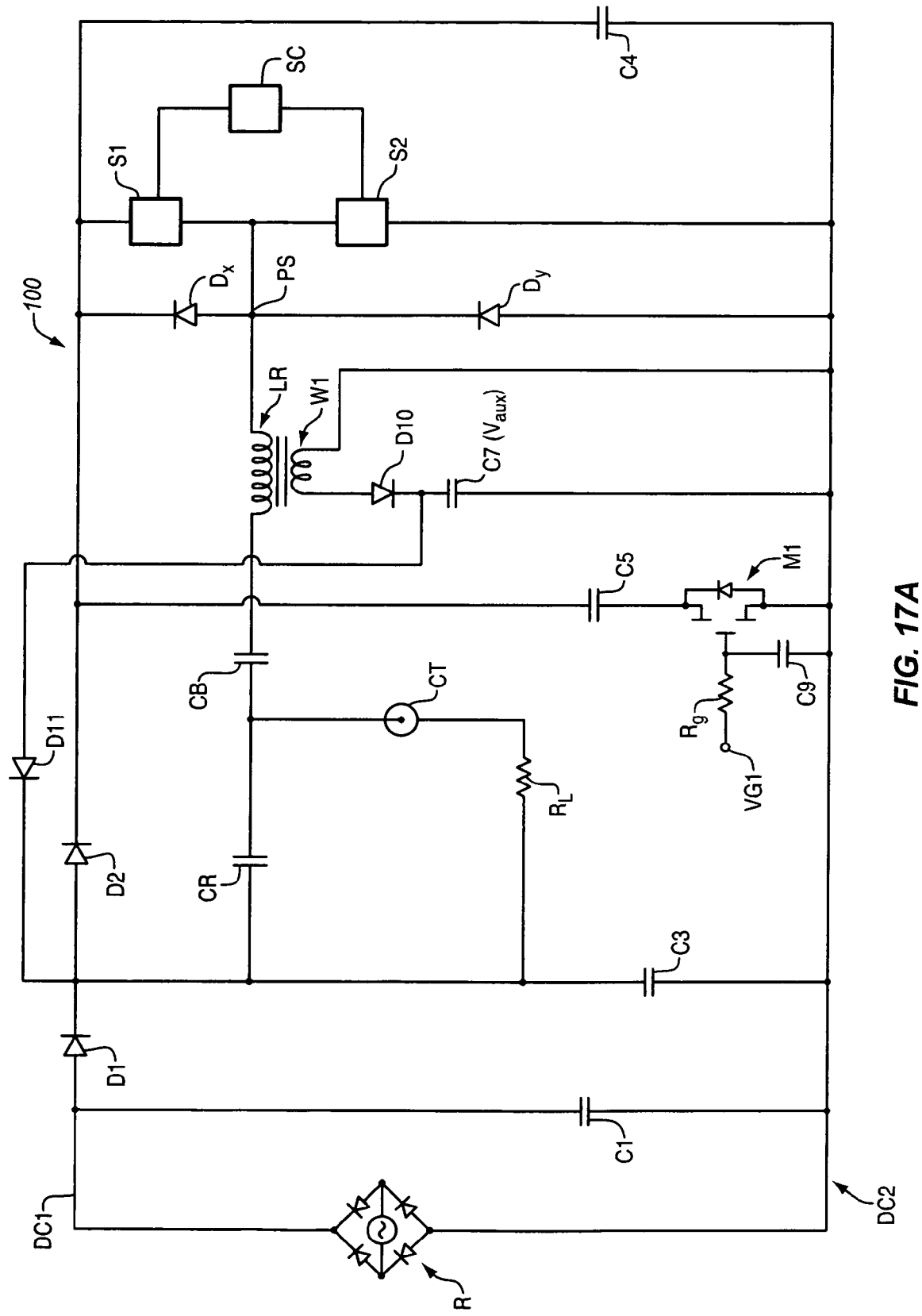
FIGS. 17A and 17B illustrate using a current transformer for sensing load current in an AC power and DC power driven load, respectively.
Figure 17B:
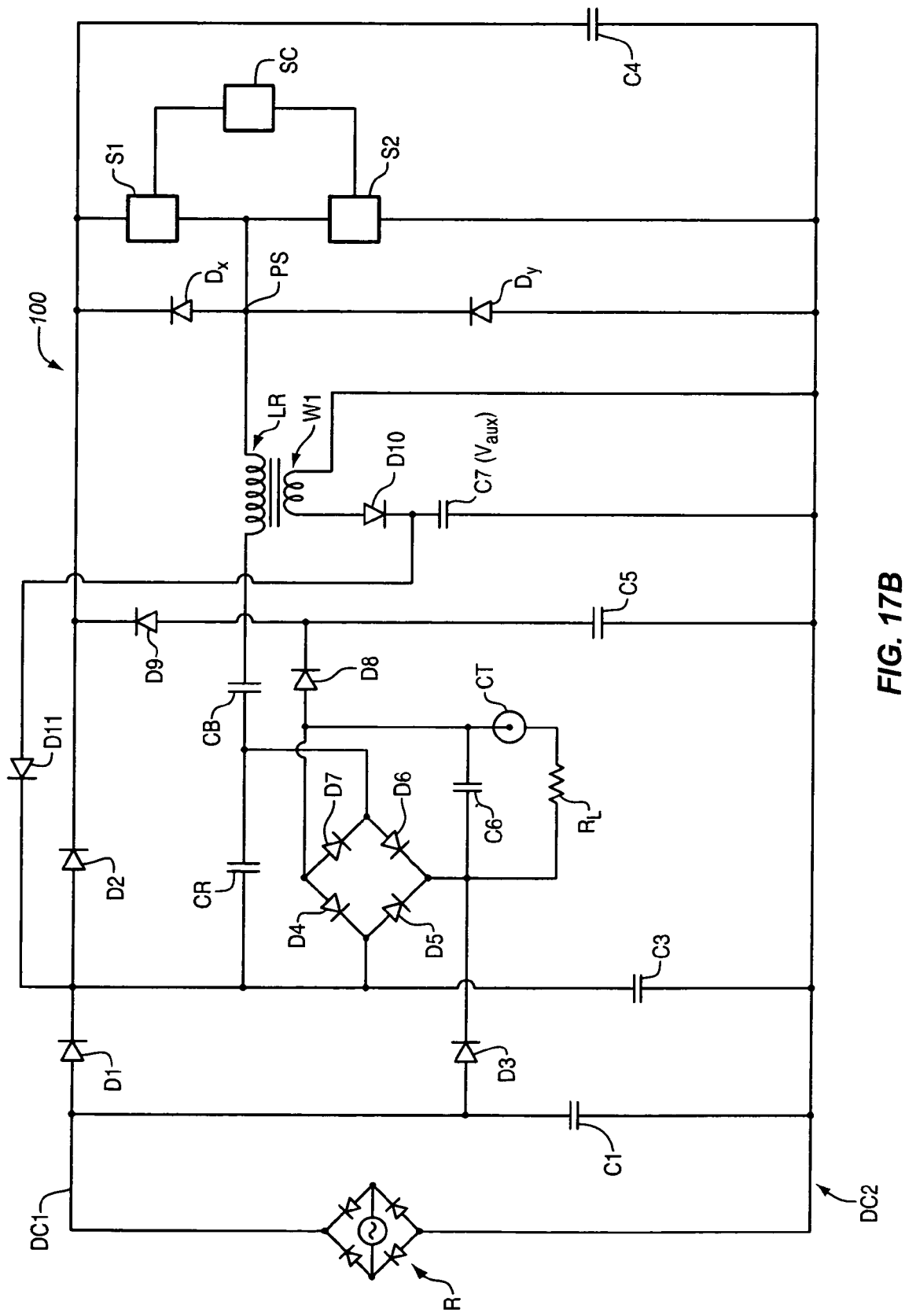

FIGS. 17A and 17B are also preferred embodiments. These figures illustrate how a load current is typically sensed using a current transformer, Cr, for AC power and DC power driven loads, respectively. The methods described in Mode A above maybe used to sense the load voltage.

Circuit Protections

Further, a major problem that is associated with single stage power conversion is that, during open circuit condition, that is, when the load is removed or under very light load, the resonant tank circuit energy raises the DC voltage on the input lines to a dangerous level that can easily exceed the voltage ratings of semiconductors and capacitors, for example, the voltage ratings of the power switches S1 and S2. Therefore, this voltage rise on the input lines must be controlled There are many ways the open circuit DC voltage rise on the input lines can be controlled. For the purpose of illustrating this subject, the circuit of FIG. 3B is used. However, this description is applicable to all other variations under the present improved single stage power converter.

Figure 18A:
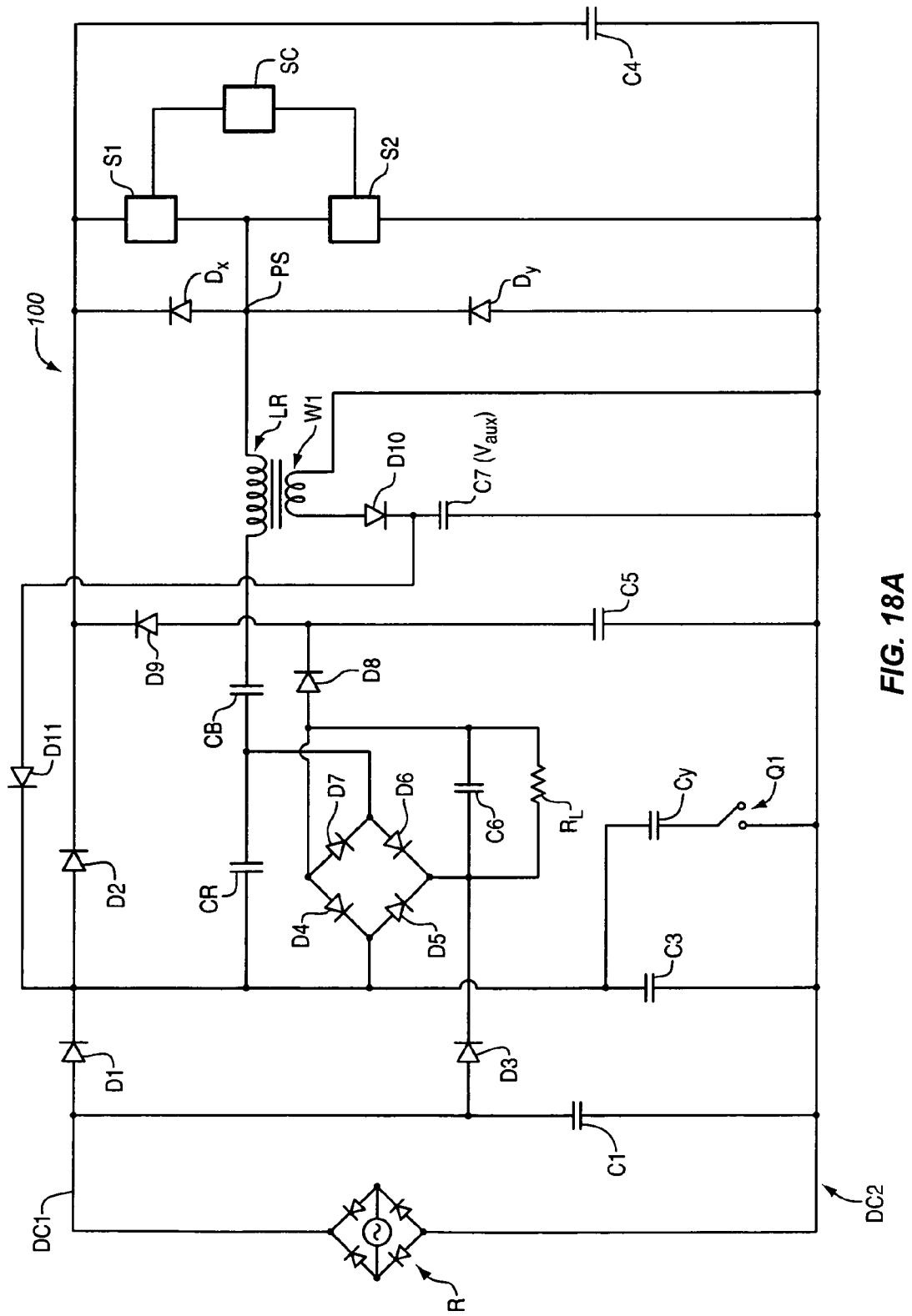
FIGS. 18A and 18B illustrate additional variations of the circuit of FIG. 3B.
Figure 18B:
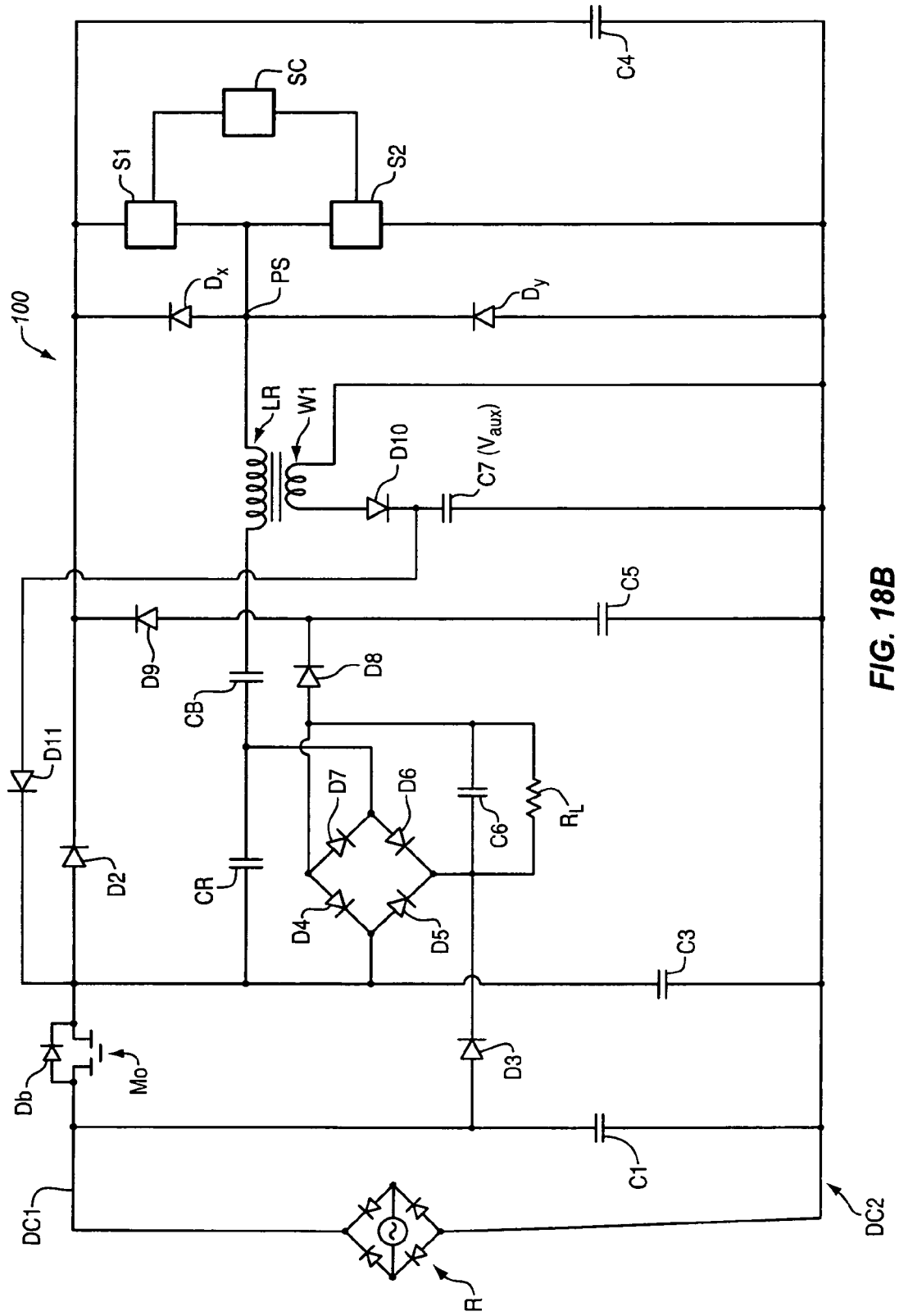

FIG. 18A shows a novel scheme whereby during the open circuit condition a series connected power switch Q1 turns on and connects a large value capacitor Cy between the junction of diodes D1 and D2. The large value capacitor Cy acts in parallel with the small value capacitor C3 during an open circuit and thereby controls the voltage rise. FIG. 18B shows another novel scheme of using a power MOSFET Mo in place of D1 of FIG. 3B for the purpose of controlling DC voltage rise. During open circuit condition, power MOSFET Mo turns on and thereby clamps the DC voltage on the input lines to a value not exceeding the peak AC voltage value. During the normal operation, power MOSFET Mo turns off but its body diode Db conducts the power.

Figure 19:
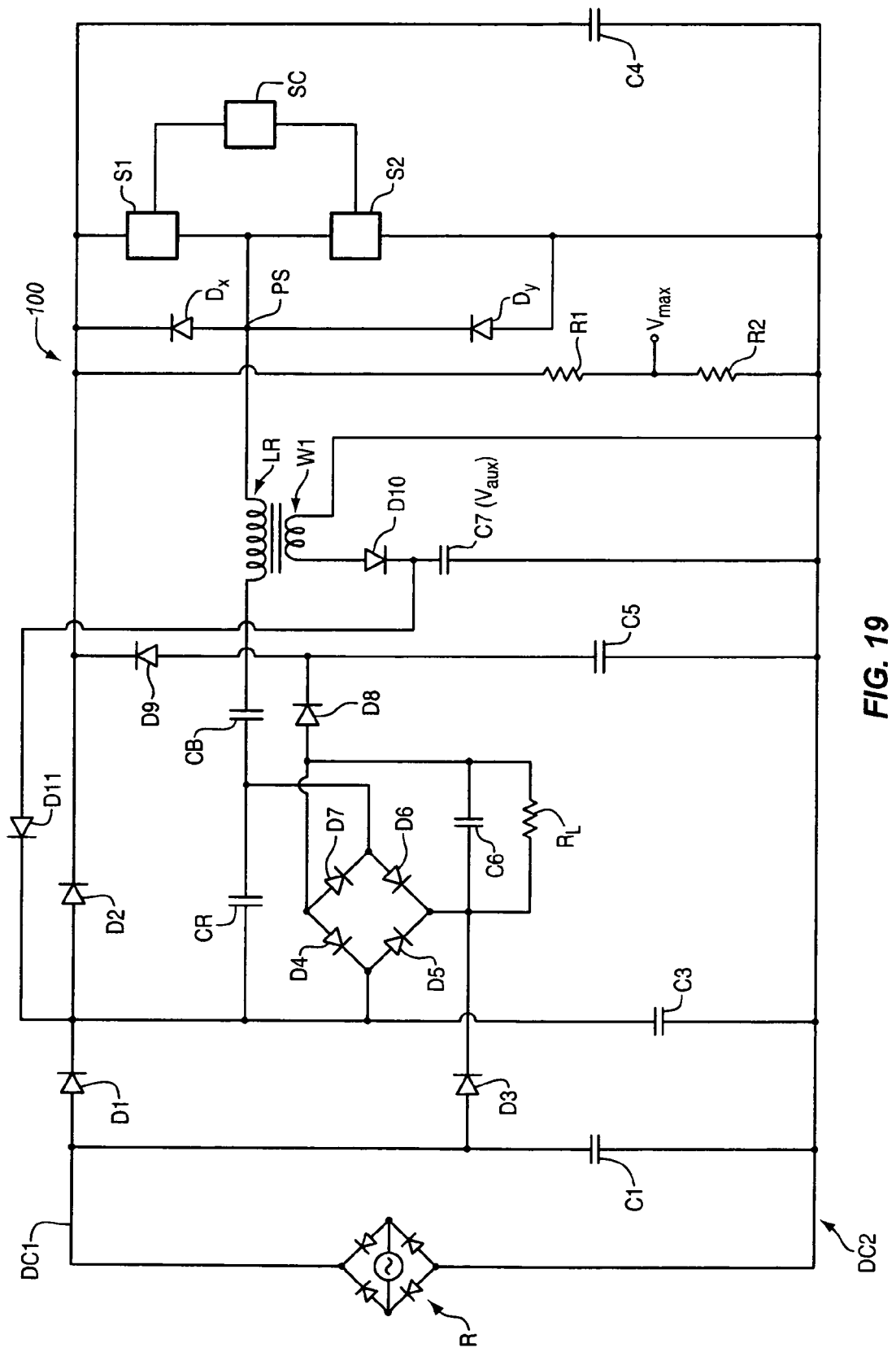
FIG. 19 illustrates the preferred method of controlling the open circuit DC bus voltage rise.

The preferred method of controlling the open circuit DC bus voltage rise is illustrated in FIG. 19. This method offers many additional benefits compared to the methods of FIGS. 18A and 18B. In FIG. 19, a resistor divider network R1 and R2 is connected between the positive DC terminal, DC1, and the negative DC terminal, DC2. This resistor network senses the scaled magnitude of the DC voltage Vmax. It is then compared with a reference voltage in a comparator. The error signal that appears at the output of the comparator is then fed to the switching control circuit SC. As the DC bus voltage starts to exceed a predetermined value, the switching control circuit SC starts to increase the switching frequency. This in turn starts to reduce the energy in the resonant tank circuit and thereby, reduces stress in power components. This is an important benefit of this improved single stage power converter. Experience shows that at least a 2 to 1 frequency increase is required to keep the DC voltage increase on the input lines to a safe level. Furthermore, the same DC voltage control circuit of FIG. 19 also protects the power conversion device, under the present improved single stage power converter, during AC line over voltage and output short circuit conditions.

Further, another problem that is associated with the open circuit condition is that, in particular, under Mode B and Mode C operation modes, even though the input DC voltage rises, it can be maintained to a predetermined value by using the scheme of FIG. 19; however, this scheme alone cannot control the output DC voltage rise across the filter capacitor C6 of FIG. 17B, for example. Therefore, an additional control circuit similar to the scheme of FIG. 14 may be used to limit this output DC voltage rise. However, in this case, as an alternative to regulating the output voltage when the output voltage exceeds a predetermined value, the comparator output, for example, may disable the output of the switching control circuit SC that turns switches S1 and S2 on and off.

The switching control circuit SC is usually constructed by incorporating off-the-shelf switched mode IC devices, such as model SG 2525 manufactured by a number of companies, such as Unitrode, ST Microelectronics, etc. SG 2525 offers many shutdown options. For example, one of the convenient options is to pull down its soft start pin.

Further, the DC voltage control circuit scheme of FIG. 19 seems to be an obvious choice. What is not obvious is that this control scheme when incorporated in the topology of the present improved single stage power converter makes it possible to realize many additional benefits. For example, as it was the case for the open circuit, it also provides output short circuit protection with reduced component stress, one of the primary objectives of this invention. This is explained as follows. During an output short circuit condition, that is, when the load impedance approaches zero, the inductor LR energy starts to rapidly increase the DC voltage on the input lines. Therefore, as soon as the DC voltage rise exceeds the predetermined maximum value, the DC voltage control scheme of FIG. 19 almost immediately increases switching frequency of power switches S1 and S2 in order to maintain the predetermined maximum DC voltage value. At this point, the nominal operating frequency may increase threefold. This causes the impedance of LR to increase by threefold. As a result, the stored energy in the inductor reduces to a minimum value. Therefore, during short circuit conditions, not only the current in the output load almost approaches zero but also the current in the power switches S1 and S2 is reduced proportionately. In other words, contrary to conventional topologies, during an output short circuit condition, the short circuit current is lower than the nominal load current.

In addition, under the present single stage power converter, when the short circuit current is maintained at a level lower than the nominal load current, it provides further benefits. Two examples are: a) complete protection against gas discharge lamp end of life characteristics such as excessive power drain due to rectifications, and b) eliminates the need for over sizing the resonant inductor, LR. This can be further explained. In FIG. 2A, for example, in a conventional half bridge arrangement where power factor corrections are accomplished by a separate boost converter, the resonant capacitor CR is connected to the negative terminal DC2 in parallel with the load. In this case, during a short circuit, resistor RS1 has to see the entire short circuit current threshold before it can pass this information to a comparator of a short circuit control circuit. Further, in order to avoid any false triggering, usually the short circuit current threshold is set such that it is much higher than the nominal operating current. Further, even a very fast response control circuit causes the short circuit current to flow for a finite period through the inductor LR and also through the power switches S1 and S2. Because of these, all these components must be rated to withstand short circuit current; in particular, in order to avoid the saturation problem, the inductor LR must be oversized at least by twofold. This adds cost and size. It is important to note that DC-to-DC converters based on almost all the popular topologies inherently suffer this problem of short circuit current conditions. In particular, flyback and buck topologies, which are based on Pulse Width Modulation, control and further, not having a DC blocking capacitor in series with the flyback inductor and the buck inductor respectively, make the situation even worse.

To make this point clear, a specific example for the circuit of FIG. 19 based on actual experiment is given as follows: Nominal line voltage is 220VAC, operating frequency is 25 kHz and output load is 250 W. To satisfy these conditions, in FIG. 19, the values for relevant components maybe chosen as follows: LR ~0.35 mH, CB ~0.47 uF, CR ~0.056 uF and C3 ~0.15 uF. In this case, the nominal peak current in the resonant inductor is found to be ~5 A. The RMS value of the voltage that appears at the junction of diodes D1 and D2 is found to be ~320V. On the other hand, during an open or short circuit this voltage at the junction of diode D1 and diode D2 rises and set to be such that this should not raise the DC bus voltage more than 450 VDC. In order to achieve this, the sense circuitry R1 and R2 senses this DC bus voltage and feed this information back to the switching control circuit SC. In turn, switching control circuit SC raises the operating frequency to ~70 kHz for maintaining the DC voltage rise not to exceed 450 VDC. At the nominal operating frequency of 25 kHz, the reactive impedance of resonant inductor LR is ~(2×3.14×25 kHz×0.35 mH) ~55 ohm. On the other hand, the reactive impedance of resonant inductor LR when operating frequency approaches 70 kHz is ~154 ohm, which is ~2.8 times the nominal operating impedance. As a result, the energy that is stored in the resonant inductor LR during an open or short circuit condition is also proportionately reduced. That is to say that the current stress in the resonant inductor LR and the power switches S1 and S2 are reduced. On the contrary, as mentioned above, in the conventional switch mode topologies, during a output short or open circuit, the DC bus voltage 100 doesn't increase. This means that the DC bus voltage sense doesn't provide output short or open circuit sensing. Therefore, for the purpose of controlling the output short circuit current, these topologies inherently require the sensing of output current which, of course, must flow through the resonant inductor LR and therefore, the current that is the energy in the resonant inductor LR increases much higher than the nominal operating current. Thus, the conventional switch mode topologies that sense output short circuit current rather than the DC bus voltage rise 100 and in particular, employ duty cycle control technique, must sense the entire short circuit current trough the resonant inductor LR. In order to avoid false triggering in a noisy environment, this short circuit current threshold is usually set to be much higher than the nominal operating current of 5 A peak. This causes increased current stresses in the resonant inductor IR and power switches S1 and S2.

The open and short circuit protection scheme of FIG. 19 makes this topology under the present improved single stage power converter, in particular, an ideal source for constructing electronic ballasts for gas discharge lamps, for example, ballasts for HPS or Metal Halide lamps (hereafter, FD lamps).

HID lamps prior to ignition offer very high impedance and thereby create open circuit conditions. On the other hand, upon ignition and during the warn up period, because of their negative resistance characteristics, HID lamps offer very low impedance. For example, a 250 W HPS lamp following the ignition may offer an impedance that is lower than a few ohms. This value creates almost a short circuit condition. By the action of the DC voltage control circuit of FIG. 19, the current into the lamp stays within a safe value and does not create extra stress on power components; rather, as explained earlier, it reduces stress. The reductions of current stress in power components both during an open circuit and short circuit of an output load offer substantial improvements in switch mode power conversions as they relate to reliability, cost and performance.

Figure 20:
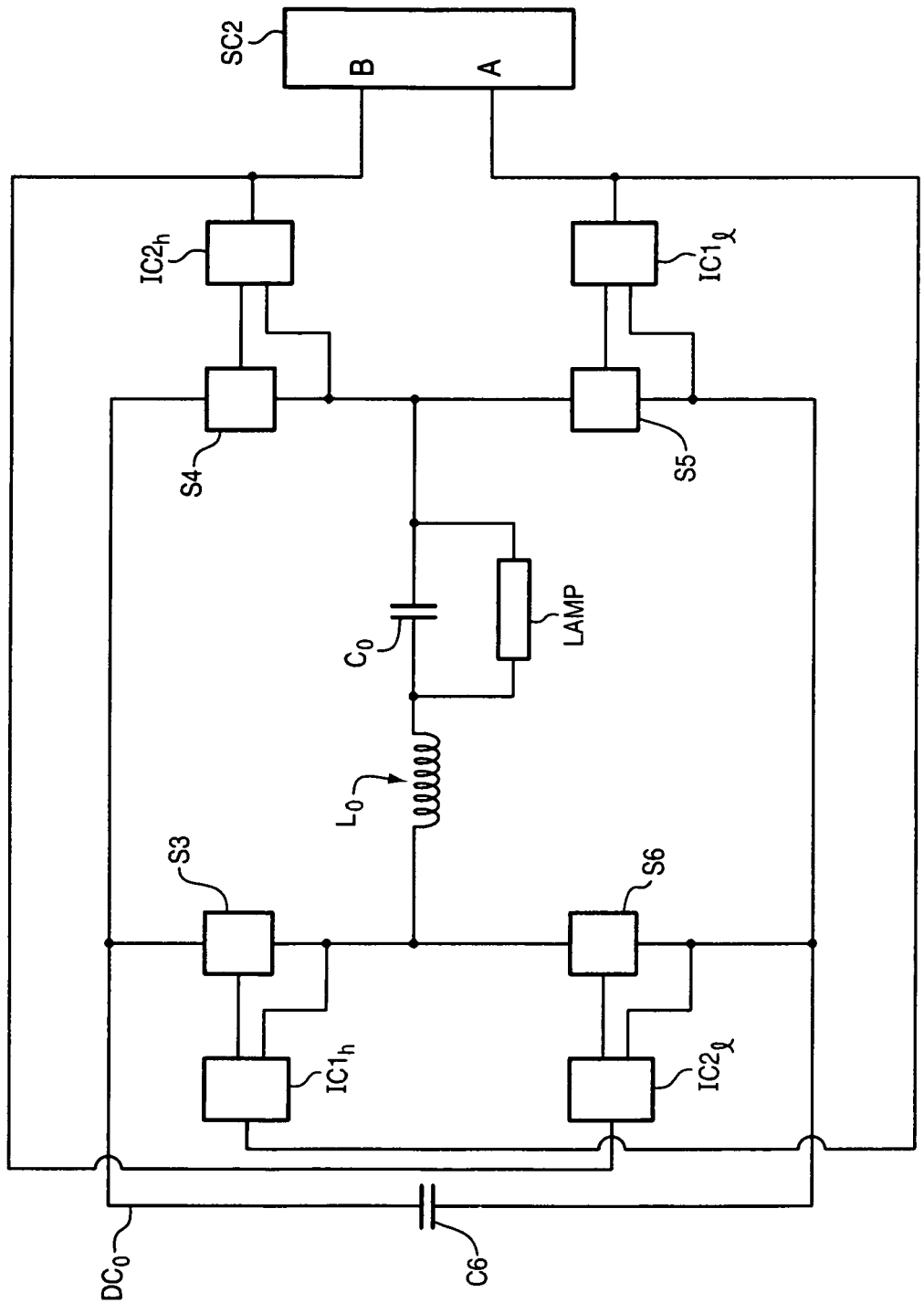
FIG. 20 illustrates an inverter using a full bridge scheme.

In FIG. 17A, when the load is a fluorescent or a HID lamp, it becomes a high frequency driven electronic ballast. On the other hand, in order to avoid acoustic resonance in the lamp, electronic ballasts for HID lamps are often required to operate with low frequency. The DC output of FIG. 17B can be used for this purpose. This DC output becomes the input power source for a low frequency inverter. For low power applications, the inverter may be a conventional half bridge. For high power applications, the inverter may be a conventional full bridge. An inverter using a full bridge scheme is shown in FIG. 20. Accordingly, the input DC source DCo across filter capacitor C6 is the DC output across the filter capacitor C6 in FIG. 14B. The switches S3 and S5 form one pair and the switches S4 and S6 form the other pair of a full bridge inverter. It is important to note that the low frequency excited HID ballast operating frequency range usually lies between 50 and 300 Hz. The switching control circuit SC2 is a conventional switched mode IC, such as model SG 2525, and generates alternate low frequency drive signals at the output terminals A and B. There are other known techniques to provide low frequency drive signals, but one convenient way to provide low frequency drive signals to respective switch pairs of a full bridge inverter is by means of a commercially available high and low side level shift driver IC, such as International Rectifier's part #IR 2110. The first IR 2110 device, IC1, is responsive to the drive signal that arrives at the terminal A and drives the switch pair S3 and S5. In FIG. 20, IC1$l$ signifies the low-side drive section of IC1, and IC1$h$ signifies the high-side drive section of IC1. Further, the second IR 2110 device, IC2, is responsive to the drive signal that arrives at the terminal B and drives the other switch pair S4 and S6. In FIG. 20, IC2$l$ signifies the low-side drive section of IC2, and IC2$h$ signifies the high-side drive section of IC2.

Further, the switches S3, S4, S5, and S6 may be bipolar, IGBT, or power MOSFET types of devices. However, the preferred choice is power MOSFET devices. This is because of the following advantages: a) during the normal operation, the operating frequency is low; therefore, the body diodes of the MOSFET devices can be used as the full bridge commutating diodes; b) low on resistance MOSFET devices yield higher power conversion efficiency, and c) during ignition period, the operating frequency is much higher. MOSFET devices are also easier to turn on and turn off at higher frequency.

Figure 21:
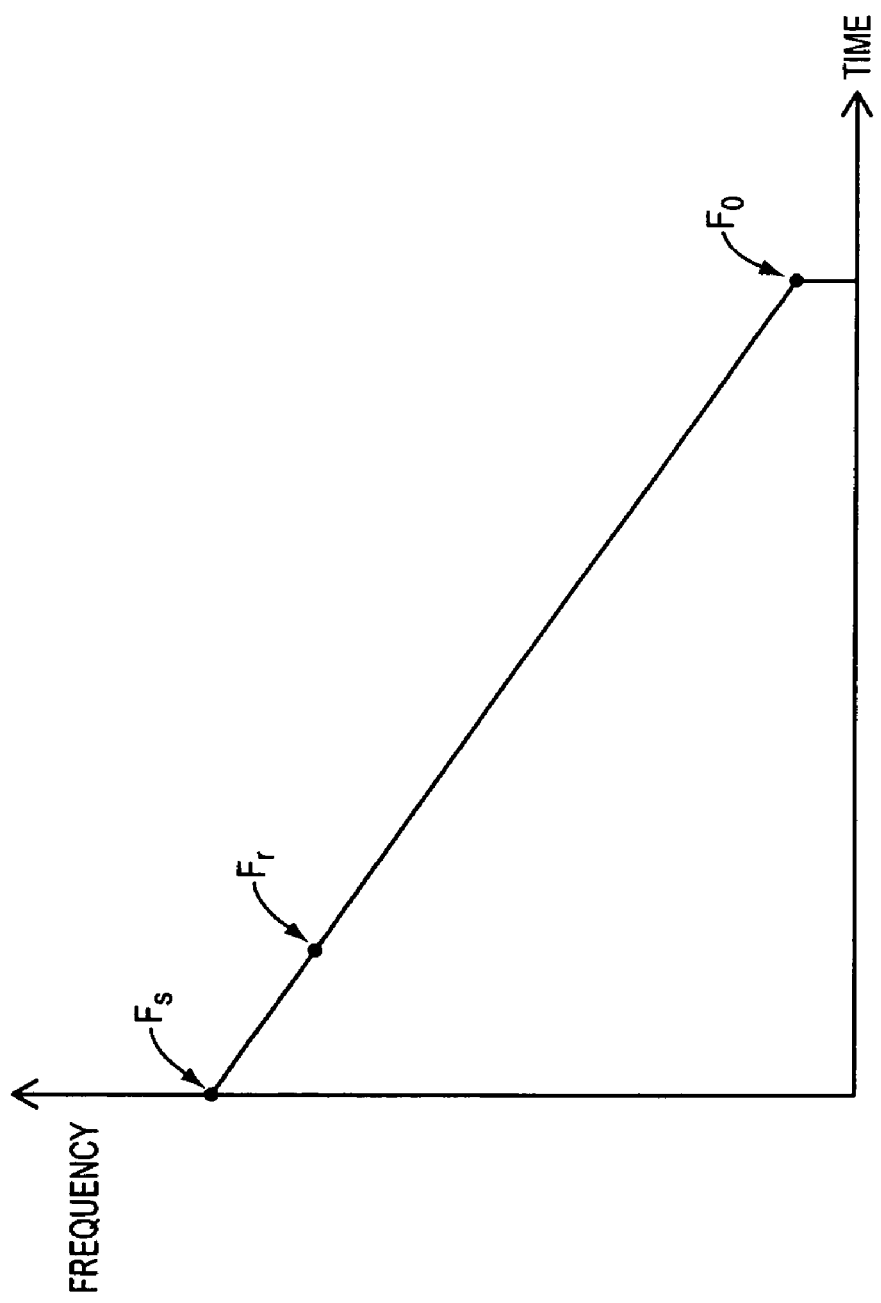
FIG. 21 illustrates a diagram of a control circuit programmed to operate at a sweeping frequency with periodic intervals.

Further, the purpose of the inductor Lo and the capacitor Co are explained as follows. HID lamps, and in particular HPS lamps, require in excess of 3000V for ignition. Therefore, at the beginning, the oscillator of the switching control circuit SC2 can be programmed by adding an analog or digital based known circuitry to operate at a sweeping frequency with periodic intervals and as well as timed modulations. For example, switching control circuit SC2 starts at a very high frequency, Fs, and gradually decreases its frequency of operation to the lamp operating frequency, Fo. This is shown in FIG. 21. During this frequency sweep period, at some instant the frequency of operation crosses a frequency Fr, which is equal to the resonant frequency of series connected inductor Lo and capacitor Co that form the resonant network. It must be noted that if desired, frequency sweep start frequency may be such that Fs~Fr.

For better understanding, an example is given. Let the value of inductor Lo 1 mH and capacitor Co ~0.0022 uF. Therefore, the resonant frequency, Fr, of this resonant network is ~107 kHz. The capacitive impedance at this frequency is $\sim 1/(2\pi FrCo)$~676 ohms. Of course, the inductive impedance is also the same. Assuming the resonant network has a high quality, Q, value, that is, inductor Lo and capacitor Co are low loss type of devices, since at resonance the capacitive and inductive impedances cancel each other, the current in the resonant tank circuit is only limited by the Q factor and DC source impedance. Therefore, at resonance, 4.5 A current into the tank circuit creates a voltage across capacitor Co in the amount of ~4.5 A×676 ohms~3042V.

Generation of the ignition voltage by frequency sweep method that crosses the resonant frequency of the control circuit is well known. U.S. Pat. No. 5,289,083, issued Feb. 22, 1994, is an example. Frequency sweep methods are also used for fluorescent lamp ignition with the preheating of the lamp filaments. Nonetheless, in a single stage power converter, the creation of ignition voltage by an input source power limited resonant tank circuit is a new concept. This can be explained as follows: it is a problem that an unloaded high quality resonant circuit can circulate very high energy when it operates near its resonant frequency. Therefore, unless it is controlled during frequency sweep, as the frequency approaches the resonance point, the voltage across capacitor Co may exceed several times more than the above-computed 3042V. Most importantly, this voltage rise may cause not only the voltage breakdown of components but also saturate the inductor Lo, which may cause the destruction of switches S3, S4, S5, and S6 that are shown in FIG. 20.

The present improved single stage power converter solves the above problem as follows: a) prior to ignition, the HID lamp offers almost infinite impedance and as a result an open circuit condition is created; therefore, as both the maximum DC voltage on the input lines and the maximum output DC voltage rise, the control circuitry becomes enabled causing much higher operating frequency that provides only minimum energy flow in the inductor LR; and b) because capacitor C6 is a small value capacitor, it can only deliver a limited amount of energy to the tank circuit of the full bridge inverter of FIG. 20. Therefore, during a frequency sweep cycle, as the generated operating frequency crosses the resonance point Fr of the resonant network the energy delivery capacity of capacitor C6 to the resonant network consisting of inductor Lo and capacitor Co is a finite value. Therefore, during the ignition mode, as more energy is drawn by the tank circuit, the quicker the voltage across capacitor C6 collapses.

Further, since capacitor C6 is low in value, it offers another important benefit during the normal operation of the HID lamp. Upon ignition, HID lamps require a few minutes of warmup before reaching a stable operating mode. During this warmup period and even during the normal operating mode, when the input AC voltage momentarily drops, lamps may experience sudden changes in their discharge characteristics. These sudden changes cause flickering and even extinction of the lamp unless power control feedback can correct the situation almost instantaneously. Therefore, if the value of capacitor C6 is high, the charging and discharging time is long, and the feedback control loop cannot make the capacitor respond quickly. More specifically, when the value of capacitor C6 is, for example, 47 uF and the lamp impedance is 60 ohms, these make a time constant=47 uF×60 ohms~2.8 miliseconds. Whereas, with capacitor C6=1 uF, the time constant is 60 microseconds. This example clearly demonstrates the benefit of having a low value filter capacitor in low frequency excited HID electronic ballast operation. In other words, a low value filter capacitor makes the power delivery and regulation circuits to behave like a fast acting impedance source. In fact, this property combined with short circuit protection with reduced stress in the power components makes this type of power conversion topology also suitable for highly efficient and reliable 50/60 Hz power inverters.

A low frequency 180 Hz operated 220V/250 W FPS ballast was constructed using the scheme of FIGS. 17B and 20. The value of capacitor C6 is 1 uF to be sufficient for a ripple content of less than 10%. Further, 500V Power MOSFET devices with 0.25 ohms on resistance were used for all the power switches. The overall power conversion efficiency was found to be ~91%. The ballast maintains a ±2% constant power in the lamp from 200V AC to 260V AC. The ballast also maintains a ±2% constant power in the lamp throughout the aging process of the lamp.

Further, the scheme as described in FIG. 17A can be used to design very efficient, reliable and reduced-fault stress based high frequency operated fluorescent and HID electronic ballasts. The overall power conversion efficiency will be higher than the low frequency excited ballasts. This is because, unlike the low frequency excited electronic ballast of FIG. 20, high frequency to DC rectifications and the DC to low frequency full bridge inversions are not required. Further, no need for output rectification means no output filter capacitor, C6 of FIG. 17B, to worry about. Therefore, load regulation response time will be even faster.

Further, in FIG. 17A, the high frequency operated gas discharge lamp is directly connected across the resonant capacitor CR. Depending on the type of the lamp, a suitable method can be employed for ignition voltage generations and operations of the lamp. For example, a suitable method can be added in the circuit of FIG. 17A from U.S. Pat. No. 5,289,083. This patent utilizes various properties of resonance circuits and discloses many novel techniques for the ignition and high frequency operation of a gas discharge lamp.

SUMMARY

The improved single stage power converter reduces output ripples by the use of an auxiliary DC supply which acts as a secondary power source near zero crossings of the line AC voltage.

What is claimed as new and desired to be protected by Letters Patent of the United States is:

1. A single stage power factor corrected power converter for providing power to a load, comprising:
   a smoothing capacitor connected across first and second terminals of a source of DC voltage;
   a pair of switching devices connected in series across said first and second terminals of said source of DC voltage, an output line being connected to a junction of said pair of serially connected switching devices, there being a switching control associated with the switching devices for switching the switching devices to conduct alternatively between positive and negative ones of said first and second terminals of said source of DC voltage at a predetermined high frequency, there being a finite time between each of the switching during which both of said switching devices are in a non-conductive state;
   a resonant circuit having a first, second and third terminals and comprising a series connected resonant inductor and an AC blocking capacitor, said resonant circuit being connected at said first terminal to said output line and at said second terminal to said first and second terminals of said source of DC voltage;
   a load connected between said third terminal of said resonant circuit and one of said first and second terminals of said source of DC voltage; and
   a secondary power source, connected to said resonant circuit for providing an auxiliary source of power to said load near zero crossings of said AC voltage.

2. The single stage power factor corrected power converter of claim 1 wherein said resonant circuit comprises:
   a resonant inductor connected at a first terminal to said output line;
   AC blocking capacitor connected at a first terminal to a second terminal of said resonant inductor; and
   a second terminal of said AC blocking capacitor being connected to said first and second terminals of said source of DC voltage.

3. The single stage power factor corrected power converter of claim 1 wherein said resonant circuit comprises:
   AC blocking capacitor connected at a first terminal to said output line;
   a resonant inductor connected at a first terminal to a second terminal of said AC blocking capacitor; and
   a second terminal of said resonant inductor being connected to said first and second terminals.

4. The single stage power factor corrected power converter of claim 1 wherein said secondary power source comprises:
- a secondary winding of said resonant inductor, a first terminal of which is connected to a second of said first and second terminals of said source of DC voltage, for generating a high frequency AC voltage across said secondary winding; and
- a rectifying diode having an anode terminal connected to a second terminal of said secondary winding and a cathode terminal connected to second terminal of said resonant circuit, for rectifying said high frequency AC voltage to produce an auxiliary DC power which is applied to said second terminal of said resonant circuit.

5. The single stage power factor corrected power converter of claim 4 wherein said secondary power source further comprises:
- a smoothing capacitor connected between said cathode of said rectifying diode and said second of said first and second terminals of said source of DC voltage for smoothing said auxiliary DC power.

6. The single stage power factor corrected power converter of claim 1 wherein said secondary power source comprises:
- a diode having an anode terminal connected to said second of said first and second terminals of said source of DC voltage and a first terminal of said load to produce a higher energy flow into said load.

7. The single stage power factor corrected power converter of claim 1 wherein said secondary power source comprises:
- a full bridge high frequency rectifier, the input terminals of which are connected between a one of said first and said second of said first and second terminals of said source of DC voltage and said second terminal of said resonant circuit, and the positive and negative output terminals of which are connected to said load.

8. The single stage power factor corrected power converter of claim 7 wherein said secondary power source further comprises:
- AC inrush control comprising:
    - a smoothing capacitor, a first terminal of which is connected to said second of said first and second terminals of said source of DC voltage; and
    - a first diode, the cathode of which is connected to a second terminal of said smoothing capacitor and the anode of which is connected to said negative output terminal of said full bridge high frequency rectifier.

9. The single stage power factor corrected power converter of claim 8 wherein said AC inrush control further comprises:
- a second diode, the cathode of which is connected to said first of said pair of input terminals and the anode of which is connected to said second terminal of said smoothing capacitor.

10. The single stage power factor corrected power converter of claim 8 wherein said AC inrush control further comprises:
- wherein said second terminal of said smoothing capacitor is connected to said first of said pair of input terminals; and
- a MOSFET connected between said first terminal of said smoothing capacitor and said second of said pair of input terminals for regulating current flow to said smoothing capacitor.

11. The single stage power factor corrected power converter of claim 1 wherein said secondary power source comprises:
- a half bridge high frequency rectifier, the input terminals of which are connected to a one of said first and said second of said first and second terminals of said source of DC voltage and the positive and negative output terminals of which are connected to said load; and
- first and second series connected high frequency filter capacitors connected across said load, the junction of said first and said second series connected high frequency filter capacitors being connected to said second terminal of said resonant circuit.

12. The single stage power factor corrected power converter of claim 11 wherein said secondary power source further comprises:
- an AC inrush control comprising:
    - a smoothing capacitor, a first terminal of which is connected to said second of said first and second terminals of said source of DC voltage, and
    - a first diode, the cathode of which is connected to a second terminal of said smoothing capacitor and the anode of which is connected to said negative output terminal of said half bridge high frequency rectifier.

13. The single stage power factor corrected power converter of claim 12 wherein said AC inrush control further comprises:
- a second diode, the cathode of which is connected to said first of said pair of input terminals and the anode of which is connected to said second terminal of said smoothing capacitor.

14. The single stage power factor corrected power converter of claim 12 wherein said AC inrush control further comprises:
- wherein said second terminal of said smoothing capacitor is connected to said first of said pair of input terminals; and
- a MOSFET connected between said first terminal of said smoothing capacitor and said second of said pair of input terminals for regulating current flow to said smoothing capacitor.

15. The single stage power factor corrected power converter of claim 1 wherein said resonant circuit further comprises:
- a resonant capacitor connected between said second terminal of said resonant circuit and said first one of said first and second terminals of said source of DC voltage.

16. The single stage power factor corrected power converter of claim 15 wherein said resonant circuit further comprises:
- a secondary resonant inductor connected in parallel with said resonant capacitor.

17. The single stage power factor corrected power converter of claim 1 wherein said resonant circuit further comprises:
- a resonant capacitor connected between said a winding tap terminal of said resonant inductor and said first one of said first and second terminals of said source of DC voltage.

18. The single stage power factor corrected power converter of claim 1 wherein said resonant circuit further comprises:
- a secondary resonant inductor connected between said output terminal and said first terminal of said resonant inductor; and
- a resonant capacitor connected between said first terminal of said resonant inductor and said first one of said first and second terminals of said source of DC voltage.

19. The single stage power factor corrected power converter of claim 1 wherein said resonant circuit further comprises:
- a secondary winding of said resonant inductor, a first terminal of which is connected to a second of said first and second terminals of said source of DC voltage, for generating a high frequency AC voltage across said secondary winding; and a resonant capacitor connected between a second terminal of said secondary winding of said resonant inductor and said first one of said first and second terminals of said source of DC voltage.

20. The single stage power factor corrected power converter of claim 1 further comprising:

an electromagnetic interference suppression circuit connected between said source of DC voltage and said pair of switching devices, comprising:

a unidirectional device serially connected between said first terminal of said source of DC voltage and a first of said pair of input lines to prevent current from flowing from said pair of switching devices to said source of DC voltage; and a filter capacitor connected across said first and said second terminals of said source of DC voltage.

21. The single stage power factor corrected power converter of claim 20 wherein said unidirectional device comprises:

a diode having an anode terminal and a cathode terminal, said anode terminal being connected to said first terminal of said source of DC voltage and said cathode terminal being connected to said first of said first and second terminals of said source of DC voltage.

22. The single stage power factor corrected power converter of claim 1 further comprising:

a load voltage sensor connected between said second terminal of said resonant circuit and said a first of said first and second terminals of said source of DC voltage for measuring the load voltage across said load;

a comparator, responsive to said load voltage and a reference voltage, for generating an error voltage indicative of the difference between said load voltage and said reference voltage; and an error compensator, responsive to said error voltage, for closed loop control of output DC voltage.

23. The single stage power factor corrected power converter of claim 22 wherein said error compensator comprises:

a resonant circuit control for modulating the operating frequency of said resonant circuit.

24. The single stage power factor corrected power converter of claim 1 further comprising:

a resonant circuit current sensor for generating a load voltage indicative of a sum of current through said AC blocking capacitor and said output load current;

a comparator, responsive to said load voltage and a reference voltage, for generating an error voltage indicative of the difference between said load voltage and said reference voltage; and an error compensator, responsive to said error voltage, for closed loop control of output DC voltage.

25. The single stage power factor corrected power converter of claim 24 wherein said error compensator comprises:

a resonant circuit control for modulating the operating frequency of said resonant circuit.

26. The single stage power factor corrected power converter of claim 1 further comprising:

an output load power sense sensor for generating a load voltage indicative of an output load current and an output load voltage; and an error compensator, responsive to said output load voltage, for providing a feedback signal to said switching control for closed loop control of said output power.

27. The single stage power factor corrected power converter of claim 1 further comprising:

a DC input voltage sensor connected across said first and second terminals of said source of DC voltage for measuring the DC voltage across said first and second terminals of said source of DC voltage;

a comparator, responsive to said input voltage and a reference voltage indicative of a predetermined maximum value of said DC voltage, for generating an error voltage indicative of the difference between said DC voltage and said reference voltage; and a switching circuit control for modulating the operating frequency of said pair of switching devices to maintain the predetermined maximum value of said DC voltage.

28. The single stage power factor corrected power converter of claim 1 further comprising:

wherein said switching circuit control is responsive to an output short circuit condition when the impedance of said load approaches zero and the inductor energy in said resonant circuit rapidly increases said input voltage, for increasing said operating frequency in order to maintain the predetermined maximum DC voltage value.

* * * * *